United States Patent
Nakanishi et al.

(10) Patent No.: US 7,475,185 B2
(45) Date of Patent: Jan. 6, 2009

(54) NONVOLATILE MEMORY SYSTEM, NONVOLATILE MEMORY DEVICE, MEMORY CONTROLLER, ACCESS DEVICE, AND METHOD FOR CONTROLLING NONVOLATILE MEMORY DEVICE

(75) Inventors: Masahiro Nakanishi, Yawata (JP); Tomoaki Izumi, Neyagawa (JP); Tetsushi Kasahara, Hirakata (JP); Kazuaki Tamura, Toyono-gun (JP); Kiminori Matsuno, Katano (JP); Shouichi Tsujita, Kyoto (JP); Takuji Maeda, Neyagawa (JP); Shinji Inoue, Neyagawa (JP); Manabu Inoue, Hirakata (JP); Masayuki Toyama, Neyagawa (JP); Keisuke Sakai, Kyoto (JP)

(73) Assignee: Panasonic Corporation, Kadoma-shi (JP)

( * ) Notice: Subject to any disclaimer, the term of this patent is extended or adjusted under 35 U.S.C. 154(b) by 381 days.

(21) Appl. No.: 11/280,810

(22) Filed: Nov. 17, 2005

(65) Prior Publication Data
US 2006/0129749 A1    Jun. 15, 2006

Related U.S. Application Data

(63) Continuation of application No. PCT/JP2005/007213, filed on Apr. 14, 2005.

(30) Foreign Application Priority Data

| Apr. 20, 2004 | (JP) | 2004-123941 |
| Sep. 28, 2004 | (JP) | 2004-281678 |
| Sep. 28, 2004 | (JP) | 2004-281679 |
| Dec. 22, 2004 | (JP) | 2004-371304 |

(51) Int. Cl.
*G06F 12/00* (2006.01)
*G06F 13/00* (2006.01)

(52) U.S. Cl. .............. 711/103; 711/100; 711/154; 711/170; 711/202

(58) Field of Classification Search .......... 711/103, 711/100, 170, 202, 206, 200, 154
See application file for complete search history.

(56) References Cited

U.S. PATENT DOCUMENTS 5,544,356 A    8/1996   Robinson et al.

(Continued)

FOREIGN PATENT DOCUMENTS

EP    0 522 780 A    1/1993

(Continued)

OTHER PUBLICATIONS

"OSTA Universal Disk Format Specification", Feb. 1997, pp. 1-112, revision 1.50, Optical Storage Technology Association, Santa Barbara, USA.

(Continued)

*Primary Examiner*—Tuan V. Thai
(74) *Attorney, Agent, or Firm*—Smith Patent Office

(57) ABSTRACT

When a file system control part 155A writes file data into a main memory 142, a file can be easily written continuously and the number of file copy can be decreased at updating a directory entry by writing the file data and a directory entry into different allocation units. In this manner, when using a nonvolatile memory in which physical block size as an erase unit is larger than cluster size, the write performance can be enhanced.

43 Claims, 33 Drawing Sheets

U.S. PATENT DOCUMENTS

| | | |
|---|---|---|
| 5,592,669 A | 1/1997 | Robinson et al. |
| 2003/0163633 A1 | 8/2003 | Aasheim et al. |
| 2005/0080985 A1 | 4/2005 | Sasaki |
| 2007/0276986 A1* | 11/2007 | Honda ........................ 711/103 |

FOREIGN PATENT DOCUMENTS

| | | |
|---|---|---|
| GB | 2 248 707 A | 4/1992 |
| JP | 5-27924 A | 2/1993 |
| JP | 6-139140 A | 5/1994 |
| JP | 7-271645 A | 10/1995 |
| JP | 7-271842 A | 10/1995 |
| JP | 7-281842 A | 10/1995 |
| JP | 2000-181784 | 6/2000 |
| WO | WO 03/088044 A | 10/2003 |

OTHER PUBLICATIONS

"Information Technology-Volume and File Structure of Disk Cartridges for Information Interchange", Nov. 1994, pp. 1-40, second edition, ISO/IEC 9293, ISO/IEC, Switzerland.

* cited by examiner

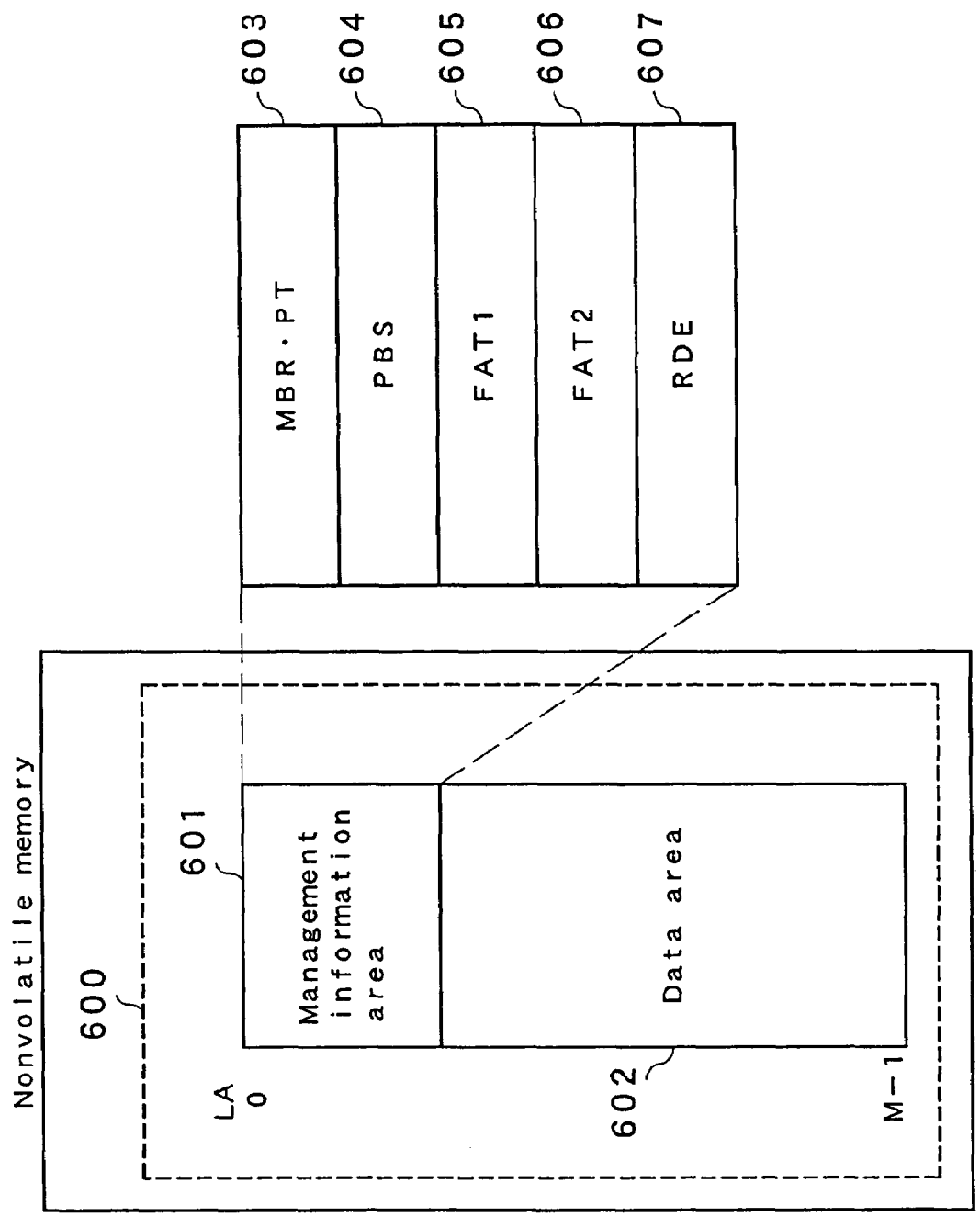

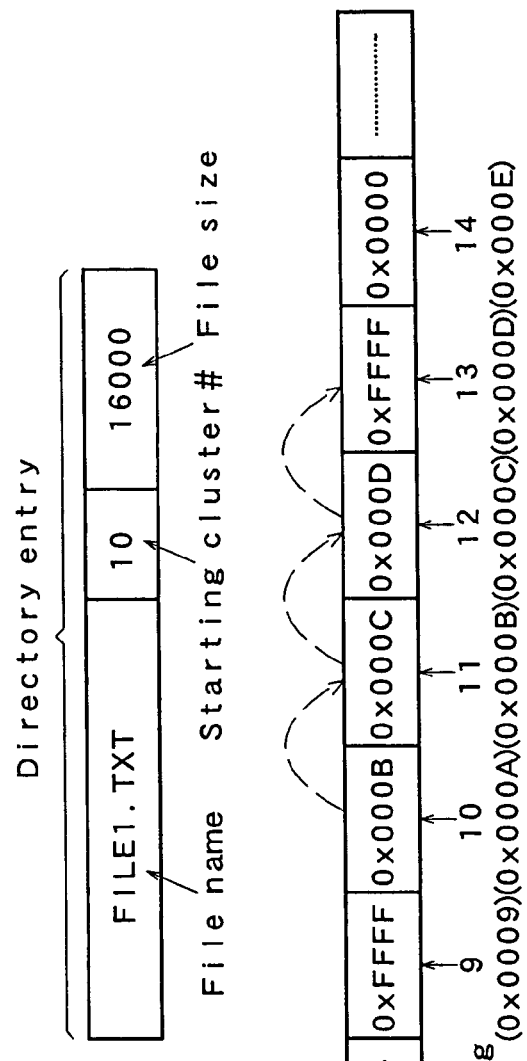
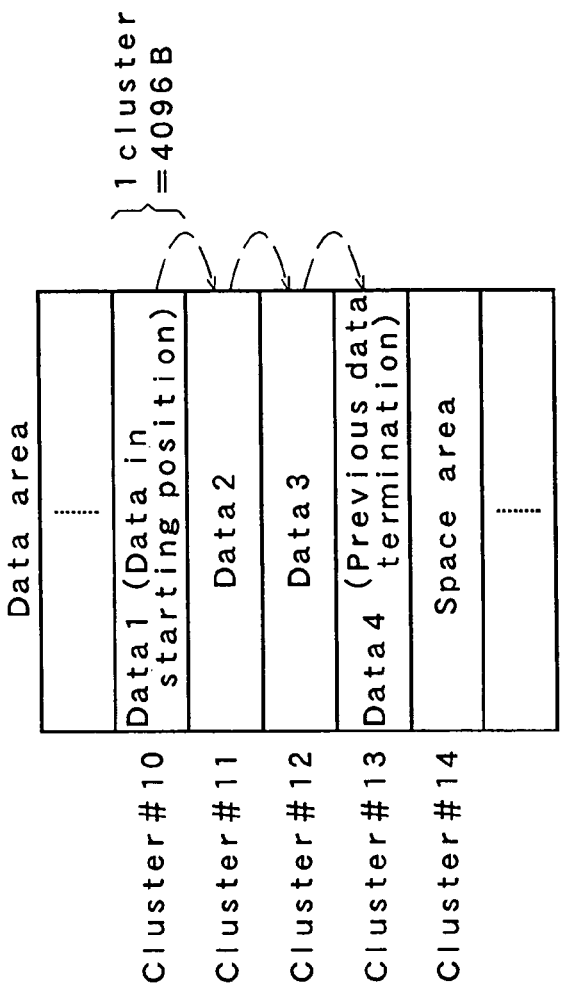
FIG. 4A
FIG. 4B
FIG. 4C

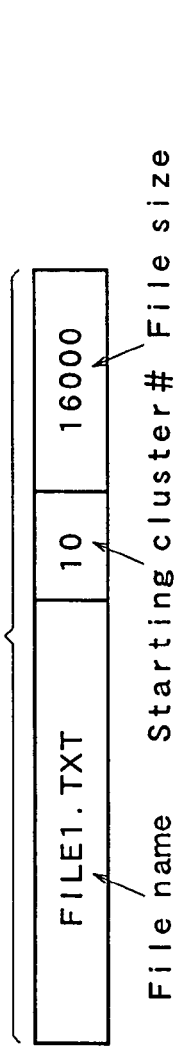
F I G. 5A
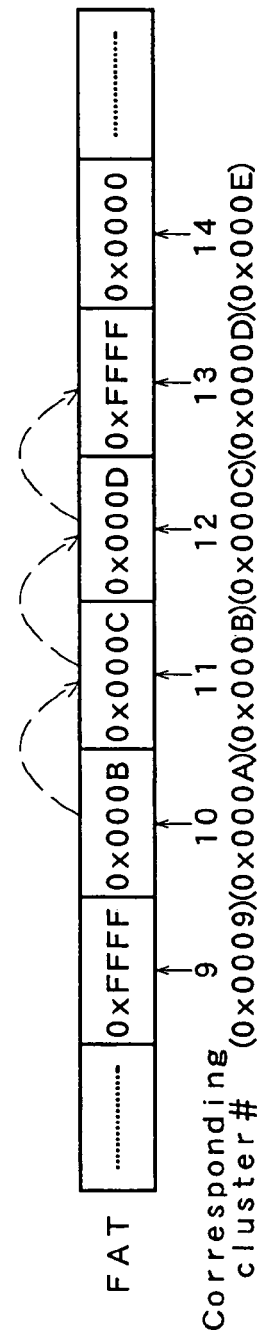
F I G. 5B
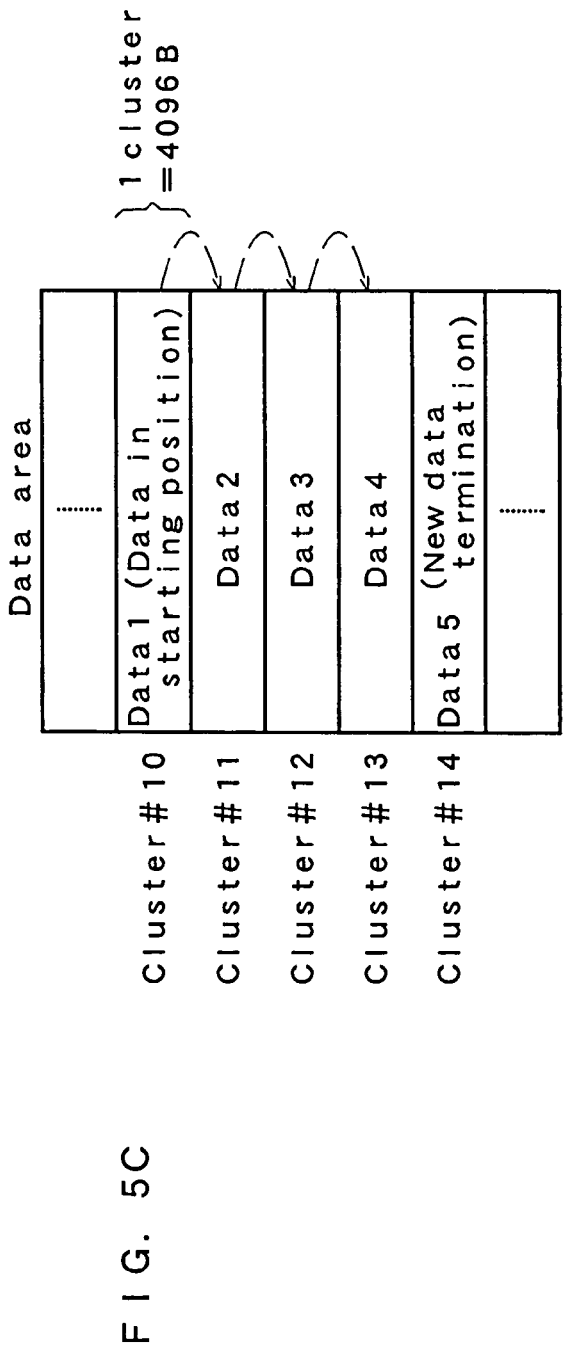
F I G. 5C

F I G. 1 9
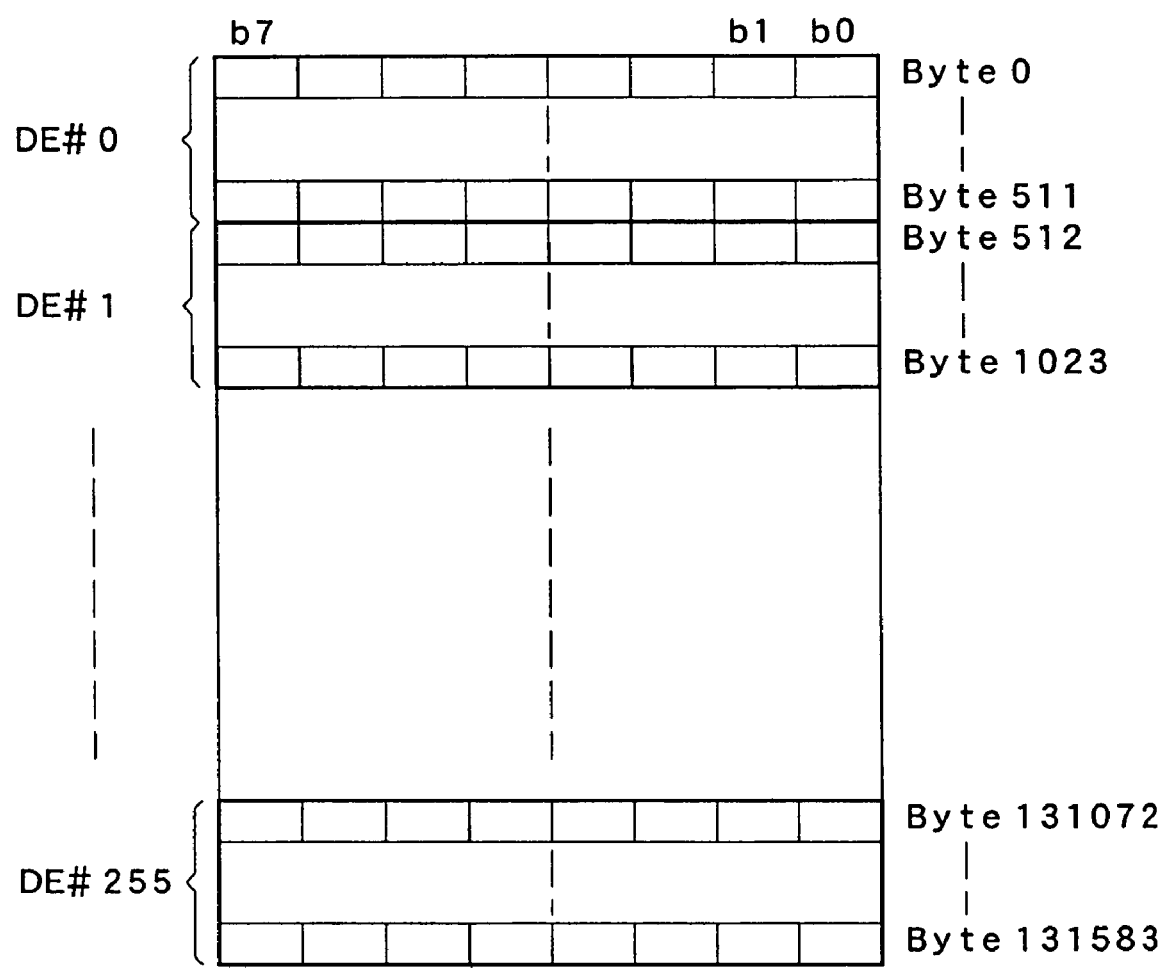

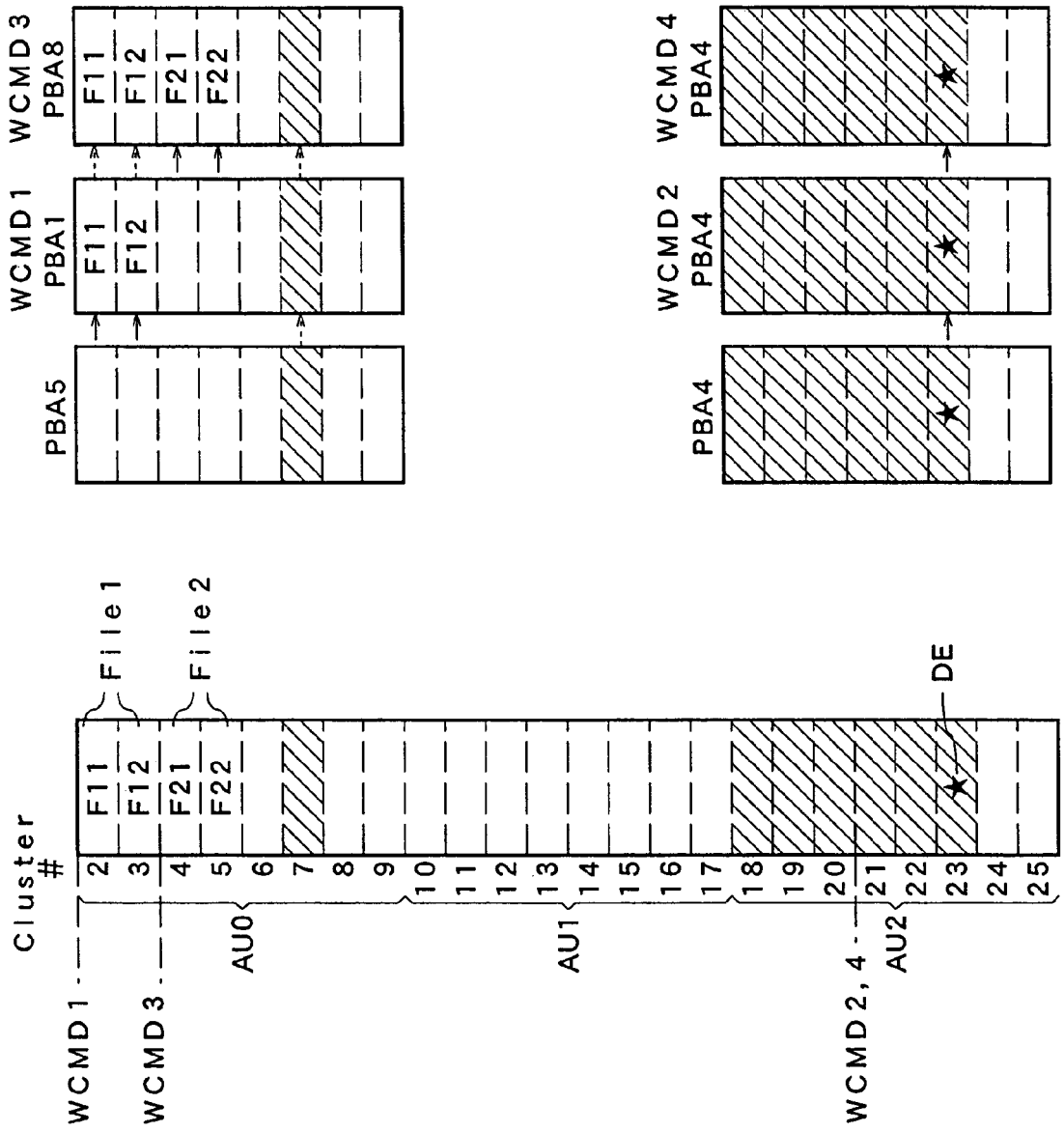

F I G. 2 5
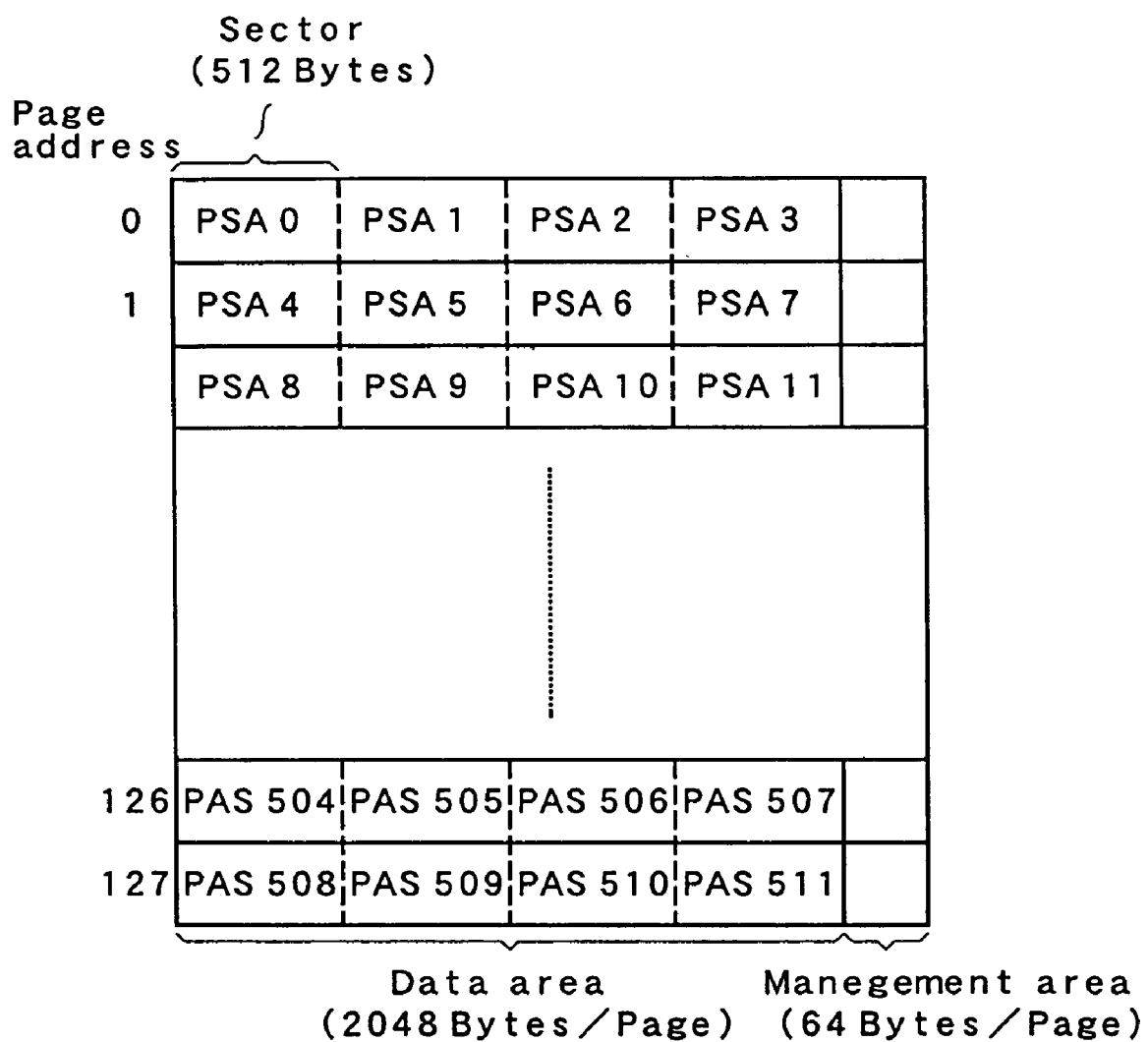

FIG. 33
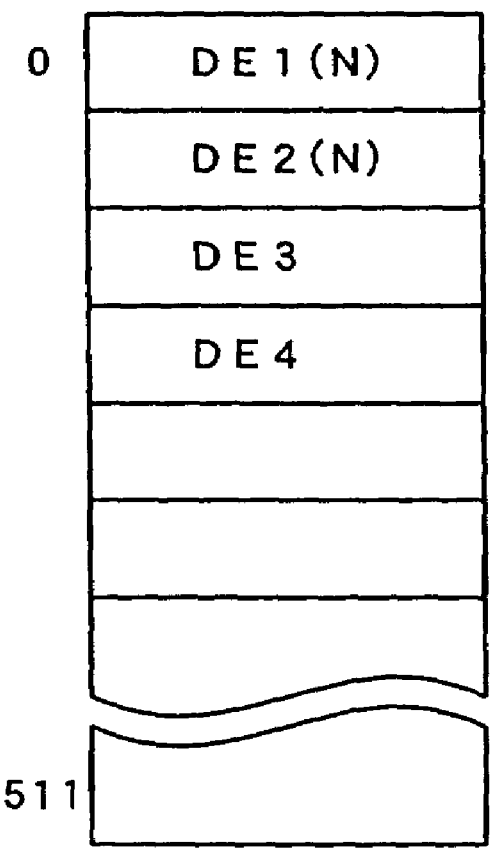
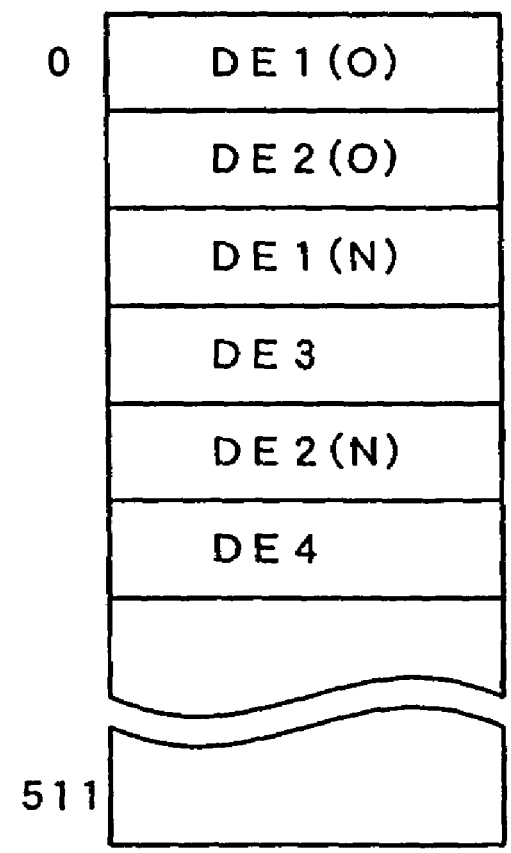

NONVOLATILE MEMORY SYSTEM, NONVOLATILE MEMORY DEVICE, MEMORY CONTROLLER, ACCESS DEVICE, AND METHOD FOR CONTROLLING NONVOLATILE MEMORY DEVICE

CROSS REFERENCE TO RELATED APPLICATIONS

This application is a continuation application of International Application No. PCT/JP2005/007213 filed on Apr. 14, 2005, currently pending which claims priority to Japanese Patent Application Nos. 2004-123941 filed on Apr. 20, 2004, 2004-281678 filed on Sep. 28, 2004, 2004-281679 filed on Sep. 28, 2004 and 2004-371304 filed on Dec. 22, 2004. The disclosure of International Application No. PCT/JP2005/007213 and Japanese Patent Application Nos. 2004-123941, 2004-281678, 2004-281679 and 2004-371304 are hereby incorporated by reference.

BACKGROUND OF THE INVENTION

1. Field of the Invention

The present invention relates to a nonvolatile memory system using a nonvolatile memory device having a rewritable nonvolatile memory as a storage medium, nonvolatile memory device, memory controller, access device, and method for controlling the nonvolatile memory device.

2. Discussion of the Related Art

A nonvolatile memory device having a rewritable nonvolatile memory, mainly a semiconductor memory card, has been widely demanded. A nonvolatile memory system using the semiconductor memory card, mainly a digital still camera, has been also widely demanded. A NAND flash memory, a nonvolatile memory, mainly used in the semiconductor memory card adopts an erase unit of 16 KB (byte). An access device using the semiconductor memory card adopts 16 KB as a write management unit, that is, a cluster capacity as an area allocation unit of file data.

In recent years, however, the nonvolatile memory system has expanded its application range as a recording/reproducing system of stream data such as moving images as well as text data and still images. Along with its application, a large-capacity flash memory which can record moving images in sufficient time has been desired. Cost reduction has been also desired. In response to the desires, a NAND flash memory adopting an erase unit of 128 KB or 256 KB has been proposed. However, a memory controller in the nonvolatile memory device handles write in units of 16 KB from the access device as write in units of 128 KB or 256 KB being the erase unit of the NAND flash memory. Therefore, it takes longer time for write in units of 16 KB relatively, seen from the access device.

A file system managing data stored in the nonvolatile memory device will be described here. The file system is a system which can easily handle data stored in the nonvolatile memory device as a file. As file systems which have been conventionally used, there exist a FAT file system (ISO/IEC9293, "Information Technology-Volume and file structure of disk cartridges for information", 1994), UDF (Universal Disk Format) (OSTA Universal Disk Format Specification Revision 1.50, 1997), and NTFS (New Technology File System). The nonvolatile memory device in which data is managed by these file systems can share file data among devices interpreting the same file system, therefore, the data can be transmitted/received among the devices. The file system prorates an information record area in which data are recorded into sectors as the minimum access unit and clusters as an assembly of sectors to manage them and manages one or more clusters as a file.

The FAT file system and a conventional nonvolatile memory system using the FAT file system will be described more specifically. FIG. 1 shows the configuration of the FAT file system. A file system management area 600 of FIG. 1 refers to the area of a nonvolatile memory managed by a file system, seen from the access device side of the nonvolatile memory system and corresponds to all areas or some areas described as user data. LA denotes a logical address, which has logical address number from 0 to M-1. In the FAT file system, a management information area 601 for managing the entire file system management area exists at the head of the file system management area, continuously a data area 602 storing data in a file exists. The management information area 601 is configured with a master boot record-partition table (MBR-PT) 603, partition boot sector (PBS) 604, FATs 605 and 606, and root directory entry (RDE) 607.

The MBR-PT 603 is a part for storing information for dividing the file system management area into a plurality of areas called partition to manage them. The PBS 604 is a part for storing management information in one partition. The FATs 605 and 606 are parts for indicating the physical storage position of data included in a file. The RDE 607 is a part for storing information of files and directories existing immediately below a root directory. Because the FAT is an important area indicating the physical storage position of data included in a file, the FATs 605 and 606 having two pieces of identical information generally exist in the file system management area and are duplexed.

The data area 602 consists of a plurality of clusters, and each cluster stores data included in a file. A file storing much data stores the data across the plurality of clusters, and a connection between the clusters is shown by link information stored in the FATs 605 and 606. A data storing example in the FAT file system will be described using FIG. 2. The data area 602 consists of fixed length block units called clusters, and each cluster has a cluster number in ascending order starting from 2. The FATs 605 and 606 manage the utilization status of each cluster and link information showing a connection between the clusters and have a FAT entry corresponding to each cluster number. The FAT entry has any one of three sizes of 12 bits, 16 bits, and 32 bits per cluster depending on the type of the FAT file system. In the example of FIG. 2, a case is shown that one entry is expressed by 16 bits. The FAT entry stores any one value of the cluster number of the next linked cluster, 0x0000 indicating that the cluster is a space area or 0xFFFF indicating that the cluster is link terminal. The example of FIG. 2 shows that the FAT entries corresponding to the cluster numbers 2, 5, and 7 store 0x0000 and the three clusters are space areas. The FAT entry corresponding to the cluster number 3 stores 0x0004, the FAT entry corresponding to the cluster number 4 stores 0x0006, and the FAT entry corresponding to the cluster number 6 stores 0xFFFF. The three clusters of the cluster numbers 3, 4, and 6 show that divided data is stored.

A file data write example in the FAT file system will be described using FIGS. 3 to 5C. FIG. 3 show a file data write process procedure in the FAT file system. FIGS. 4A to 4C show an example of a directory, the FATs 605 and 606 and the data area 602 respectively before the write process, and FIG. 5A to 5C show the example of them after the write process. In the FAT file system, the root directory entry 607 or part of the data area 602 stores a directory entry which has stored information such as a file name, file size, and file attribute. FIG. 4A shows an example of the directory entry. A file indicated by the directory entry has a file name represented as FILE1.TXT, data of the file are stored in clusters starting from the cluster number 10, and file size is 16 KB. In FIG. 4C, the size of one cluster is assumed to be 4096 bytes and the file data is stored across four clusters.

The file data write process will be described using FIG. 3. At first, the file data write process reads the directory entry of a target file (S801). Next, the file start cluster number stored in the read directory entry is obtained, and the head position of file data is checked (S802). Next, the FATs 605 and 606 are read to trace the link on the FATs 605 and 606 sequentially from the head position of the file data obtained in S802, and the cluster number in the write position is obtained (S803). Next, in writing data, it is determined whether a space area needs to be allocated to the file (S804). When the space area allocation is unnecessary, the routine is advanced to the process of S806. When the space area allocation is necessary, a space area is searched on the FATs 605 and 606, and a space area of one cluster is allocated to the termination of the file (S805). Next, the maximum amount of data that can be written into the currently referred cluster is written into the data area 602 (S806). Next, it is determined whether the data write of all data has been completed (S807). When there is remaining data, the routine is returned to the process of S804. When the data write of all data has been completed, the file size and time stamp stored in the directory entry are updated and are written into the nonvolatile memory device (S808). Finally, the FATs 605 and 606 are written into the nonvolatile memory device to complete the process (S809).

When the file data write process additionally writes data of 1 KB into FILE1.TXT having data of 16 KB shown in FIG. 4A, the file is changed to a file having data of 17 KB shown in FIG. 5A. As described above, the FAT file system performs allocation in units of clusters for a file data storage area and data are stored.

FIG. 6 is a block diagram of the conventional nonvolatile memory system. In FIG. 6, the nonvolatile memory system consists of a nonvolatile memory device 101 and access device 102. The nonvolatile memory device 101 includes a memory controller 103 and nonvolatile main memory 104. The memory controller 103 includes a host interface 111 (the interface is described as I/F in the drawings), CPU 112, RAM 113, ROM 114, and control part 115. The host interface 111 is an interface transmitting/receiving various commands, logical address, and data to/from the access device 102. The ROM 114 stores a program controlling the entire memory controller 103. The program uses the RAM 113 as a temporary storage area and is operated on the CPU 112. The control part 115 is a circuit controlling the main memory 104 as the data storage area in the nonvolatile memory device 101. The control part 115 includes an address managing part 116 managing the address of the main memory and main memory access part 117.

In FIG. 6, the access device 102 accesses the nonvolatile memory device 101 and includes a CPU 121, RAM 122, ROM 123, and slot 124. The ROM 123 stores a program controlling the access device 102. The program uses the RAM 122 as a temporary storage area and is operated on the CPU 121. The slot 124 is a connection part of the nonvolatile memory device 101 and the access device 102. The access device 102 transmits/receives various commands, logical address, and data to/from the nonvolatile memory device 101 via the slot 124. Further, the ROM 123 includes an application program 125, file system control part 126, and access control part 127.

FIG. 7 is a block diagram showing the address managing part 116. The address managing part 116 includes an address converting table 132, physical area managing table 133, and table access part 131.

FIG. 8A is an explanatory view showing a physical block of the nonvolatile main memory 104 and is an example in which physical block size is 16 KB. In FIG. 8A, each physical block consists of 32 pages having page addresses 0 to 31. Each of the pages consists of a data area (512 bytes) for one sector indicated by hatching and a management area (16 bytes).

FIG. 8B is an example in which physical block size is 128 KB. In FIG. 8B, each physical block consists of 128 pages having page addresses 0 to 127. Each of the pages consists of a data area of four sectors (2048 bytes) and a management area (64 bytes). One sector indicated by hatching has an area of 512 bytes. In-page arrangement numbers 0 to 3 are given to four sectors of each of the pages.

FIG. 9A is an explanatory view showing the format of logical block address LBA that the access device 102 specifies to the nonvolatile memory device 101 when the physical block size of the nonvolatile main memory 104 is 16 KB. In FIG. 9A, sector numbers and cluster numbers are shown sequentially from the low-order bit. In the description below, explanation on the basis that cluster size is 16 KB will be done. The address converting table 132 converts the cluster numbers b19 to b5 to 32768 physical block addresses PBA in the main memory 104. Other bits are used as the page addresses of 32 pages in the physical block.

FIG. 9B is an explanatory view showing the format of the logical block address LBA that the access device 102 specifies to the nonvolatile memory device 101 when the physical block size of the nonvolatile main memory 104 is 128 KB. In FIG. 9B, sector numbers and cluster numbers are shown sequentially from the low-order bit, and the address converting table 132 converts b19 to b9 to 2048 physical block addresses PBA in the main memory 104. Bits b8 to b2 correspond to the page addresses of 128 pages in the physical block. Bits b1 to b0 correspond to in-page arrangement numbers. The main memory 104 has a capacity of 2 G bit (256 MB).

FIG. 10A is an explanatory view showing the physical management area table 133 when the physical block size of the main memory 104 is 16 KB, and FIG. 10B is an explanatory view when the physical block size of the main memory 104 is 128 KB. In FIGS. 10A and 10B, the address of the physical area managing table 133 corresponds to the physical block address PBA of the main memory 104 and the status of each physical block, that is, the block status is stored by 2 bits. In binary, the value 00 indicates a valid block in which valid data is stored, the value 01 indicates an unnecessary invalid block in which data is written, the value 10 indicates a bad block which cannot be used due to a solid error on a memory cell, and the value 11 indicates an erased block.

FIG. 11A is an explanatory view showing an address converting table 132 when physical block size of the main memory 104 is 16 KB, and FIG. 11B is an explanatory view showing the address converting table 132 when physical block size of the main memory 104 is 128 KB. In FIGS. 11A and 11B, the physical block address PBA is stored in the address converting table 132 corresponding to the logical address LBA specified by the access device 102, that is, b19 to b5 of the logical block address LBA shown in FIG. 9A or b19 to b9 of the logical block address LBA shown in FIG. 9B.

The operation of the conventional nonvolatile memory system will be described. The access device 102 configures logical address arrangement shown in (a) of FIG. 12 by formatting the nonvolatile memory device 101 based on the FAT file system. In FIG. 12, the MBR-PT 603 adjusts the size of a management information area 601 consisting of PBS 604, FATs 1 and 2, and RDE 607 and sets them to be the multiple length of cluster size. In FIG. 12, (b) and (c) show the main memory 104 storing the contents of the logical addresses. In FIG. 12, (b) shows arrangement in the case of 16 KB being the size of an erase unit, that is, physical block PB, and (c) shows arrangement in the case of 128 KB being the size of the physical block PB. In either case, the data area 602 shown in FIG. 1, that is, the area starting from the cluster #2 of the logical address arrangement of (a) of FIG. 12 is matched with the boundary of the physical block PB.

In the initializing process, the CPU 112 reads address management information 118 of the main memory 104 via a main memory access part 117, and configures the address converting table 132 and the physical area managing table 133 shown in FIG. 7. The description of other initializing processes is omitted.

After such format and initialization, the access device 102 starts accessing the main memory 104. Its operation will be described below by taking a write process as an example. The access control part 127 in the access device 102 sends out a write instruction to the file system control part 126. The file system control part 126 searches a space area based on the FATs 605 and 606 shown in FIG. 1, and, when a space area exists, writes data into the obtained space area. At this time, the access device 102 transfers write command WCMD, predetermined logical address, and data to the nonvolatile memory device 101. In the nonvolatile memory device 101, the CPU 112 identifies the write command WCMD and transfers control to the control part 115. In the control part 115, the address managing part 116 decides a target physical address for data write based on the logical address transferred by the access device 102. In the address managing part 116, the table access part 131 shown in FIG. 7 searches an erased physical block based on the physical area managing table 133 to specify the physical block to a block to be written. Further, the table access part 131 writes the physical block address PBA being the block to be written in a predetermined logical address position of the address converting table 132. In searching the erased physical block of the table access part 131, a search function considering wear leveling is generally provided so as not to concentrate write or erase on a specific physical block.

SUMMARY OF THE INVENTION

The lowering of the write performance due to physical block size larger than cluster size (16 KB) will be described using FIGS. 13 and 14. FIGS. 13 and 14 are explanatory views showing how file data and a directory entry are written into the physical block in the main memory 104 when write is performed to the logical address of the data area in the file system management area. As shown in FIG. 12, the FATs 605 and 606 are written into the management information area, the description of write of the FATs 605 and 606 is omitted for simplification. FIG. 13 shows the case that physical block size is 16 KB, and FIG. 14 shows the case that physical block size is 128 KB. In the drawings, the hatched clusters are clusters in use, and directory entries exist in the clusters indicated by a star mark. The unhatched clusters are space clusters. EA indicates a continuous space area. An example of writing two kinds of file data of files 1 and 2 will be described. The file 1 is a file consisting of F11 and F12. The higher order of the given number indicates a file number and the lower order of the given number indicates write order. Likewise, the file 2 is a file consisting of F21 and F22, and the higher order of the given number indicates a file number and the lower order of the given number indicates write order. The numbers of WCMD 1 to WCMD 5 indicate the issuing order of the write command WCMD. Here, the solid arrow indicates a write process and the dashed arrow indicates a copy process.

A write process when physical block size is 16 KB will be described using FIG. 13. The file system control part 126 searches clusters 2, 4, 5, and 6 as space areas and writes file data into the clusters. The F11 and F12 cannot be written so as to be continuous because a directory entry has already existed in the cluster 3 following the cluster 2 into which the F11 is written. In other words, the write instruction of the F11 and F12 need to be issued by two write commands of WCMD1 and WCMD2. At first, to write F11, the access device 102 issues the WCMD1 to the nonvolatile memory device 101. The address managing part 116 searches an erased physical block, that is, PBA5, and designates it as a block to be written. And, the main memory access part 117 writes the F11 into the PBA 5. Next, to write the F12, the access device 102 issues the WCMD2 to the nonvolatile memory device 101. The address managing part 116 searches PBA1 as an erased physical block and adopts a block to be written. The main memory access part 117 writes the F12 into the PBA1. As the write of the F11 and F12, that is, a series of write of the file 1 has been completed, the file system control part 126 performs update instruction of the directory entry of the cluster 3. At this time, when a directory entry has already existed in PBA22, after the directory entry is read from the PBA22 and the directory entry is updated, the updated directory entry is written into erased physical block PBA33 searched by the address managing part 116.

Next, the F21 and F22 as the file 2 are written into the clusters 5 and 6, respectively. Because the clusters 5 and 6 are continuous areas on the logical address, they can be written by one write command (WCMD4). The nonvolatile memory device 101 receives the WCMD4 and writes the F21 and F22 into erased physical blocks PBA8 and PBA55, respectively. After that, the updated directory entry is written into PBA41.

A write process when physical block size is 128 KB will be described using FIG. 14. On the logical address, the logical address range at least the physical block size is defined as an allocation unit. In FIG. 14, the allocation unit size (AU size) has a size equal to the physical block size, that is, 128 KB. A file write process on the logical address is similar to the physical block size of 16 KB, but a method for writing into a physical block is different. At first, the clusters 3 and 7 in use are assumed to be written into physical block PBA5. According to the write process of the F11, the F11 is written into the erased physical block PBA1 searched by the address managing part 116, and data written into the PBA5 is copied to the PBA1. In the similar manner, write and copy into the physical block are performed according to write of each file.

Comparing FIG. 13 with FIG. 14, when the physical block size is 16 KB, the number of write is four and the number of copy is two. On the other hand, when the physical block size is 128 KB, the number of write is four and the number of copy is 19. Thus, when using a nonvolatile memory having the physical block size larger than the cluster size, the number of copy is increased, and the write performance is found to be lowered.

There can be summarized in the following two factors that when using a nonvolatile memory having physical block size larger than cluster size, the write performance is lowered.

1. Since a file and a directory entry are mixed in one allocation unit, a continuous area for writing file data is hardly secured, that is, the file data are hardly written continuously.

2. Since a file and a directory entry corresponding to the file are mixed in one allocation unit, the file is copied at updating the directory entry.

An object of the present invention is to solve the two factors lowering the write performance, thereby increasing the write performance when using a nonvolatile memory having physical block size larger than cluster size.

As the device of present invention writes file data and a directory entry into different allocation units, the file data can be easily written continuously and the number of file copy can be decreased at updating the directory entry. Further, as the directory entry has a capacity much smaller than physical block size, data is written into a nonvolatile auxiliary memory in which the assured rewrite number is larger than that of the main memory, and which enables overwrite, so that the directory entry update speed can be increased.

BRIEF DESCRIPTION OF THE DRAWINGS

FIG. 1 is a block diagram of a FAT file system;

FIG. 4A is an explanatory view showing an example of a directory entry before a write process in the FAT file system;

FIG. 4B is an explanatory view showing an example of FATs 605 and 606 before a write process in the FAT file system;

FIG. 4C is an explanatory view showing an example of a data area 602 before a write process in the FAT file system;

FIG. 5A is an explanatory view showing an example of a directory entry after a write process in the FAT file system;

FIG. 5B is an explanatory view showing an example of FATs 605 and 606 after a write process in the FAT file system;

FIG. 5C is an explanatory view showing an example of a data area 602 after a write process in the FAT file system;

FIG. 19 is an explanatory view showing the structure of a physical block when physical block size of the main memory 143 is 128 KB;

FIG. 24 is an explanatory view showing how file data and a directory entry are written into a physical block in a main memory 171;

FIG. 25 is a diagram showing the recording status of a physical block for a directory entry;

FIG. 33 is an explanatory view showing a logical block for a data entry on a logical address space of this embodiment and a physical block corresponding thereto;

DESCRIPTION OF THE PREFERRED EMBODIMENTS

First Embodiment

Figure 8A:
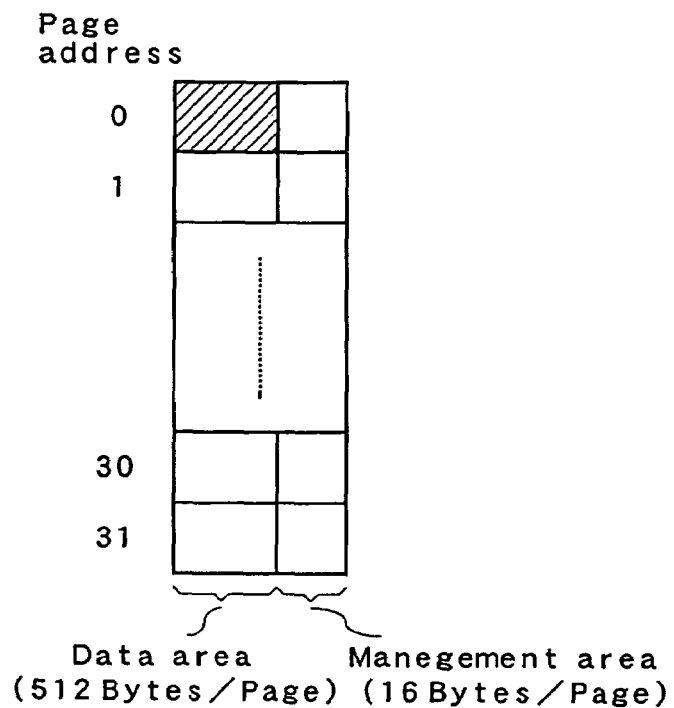
FIG. 8A is an explanatory view showing a physical block of a nonvolatile main memory 104 when the physical block is 16 KB.
Figure 8B:
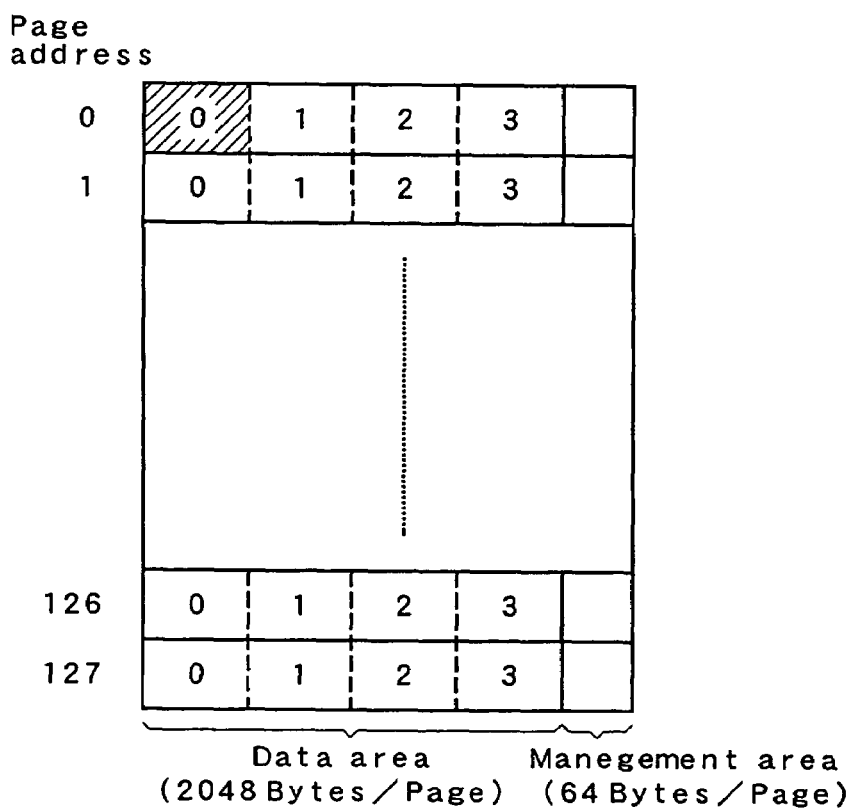
FIG. 8B is an explanatory view showing a physical block of the nonvolatile main memory 104 when the physical block is 128 KB.
Figure 9A:
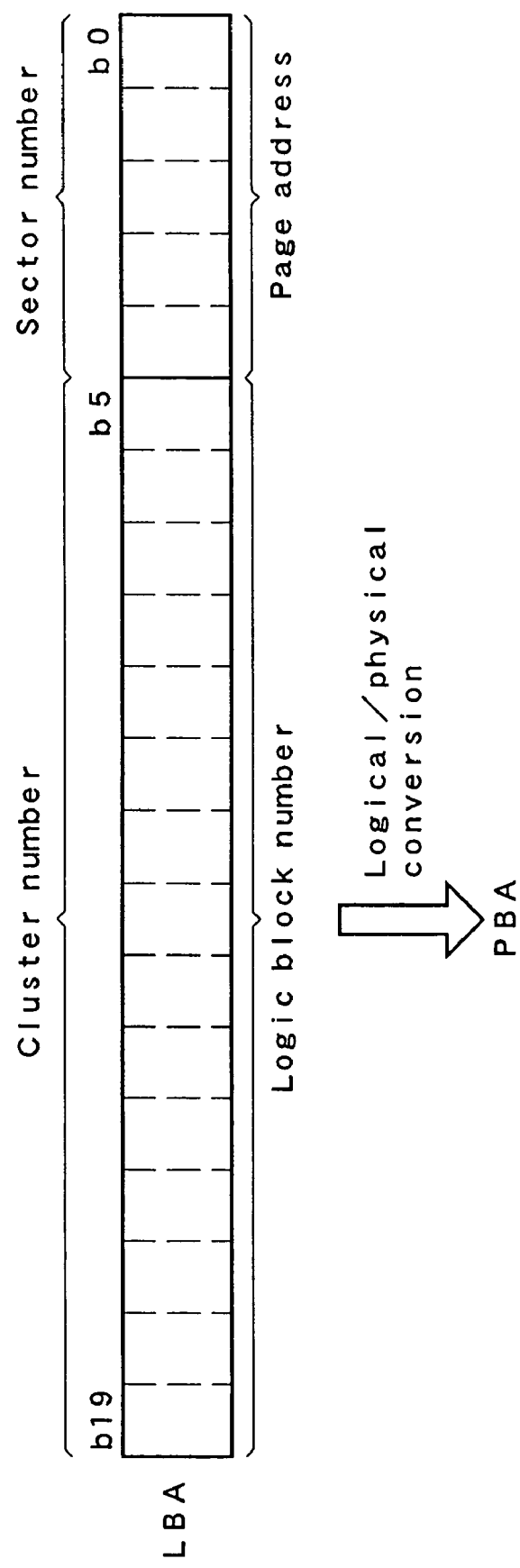
FIG. 9A is an explanatory view showing a logical address format when an access device 102 specifies to a nonvolatile memory device 101 when physical block is 16 KB.
Figure 9B:
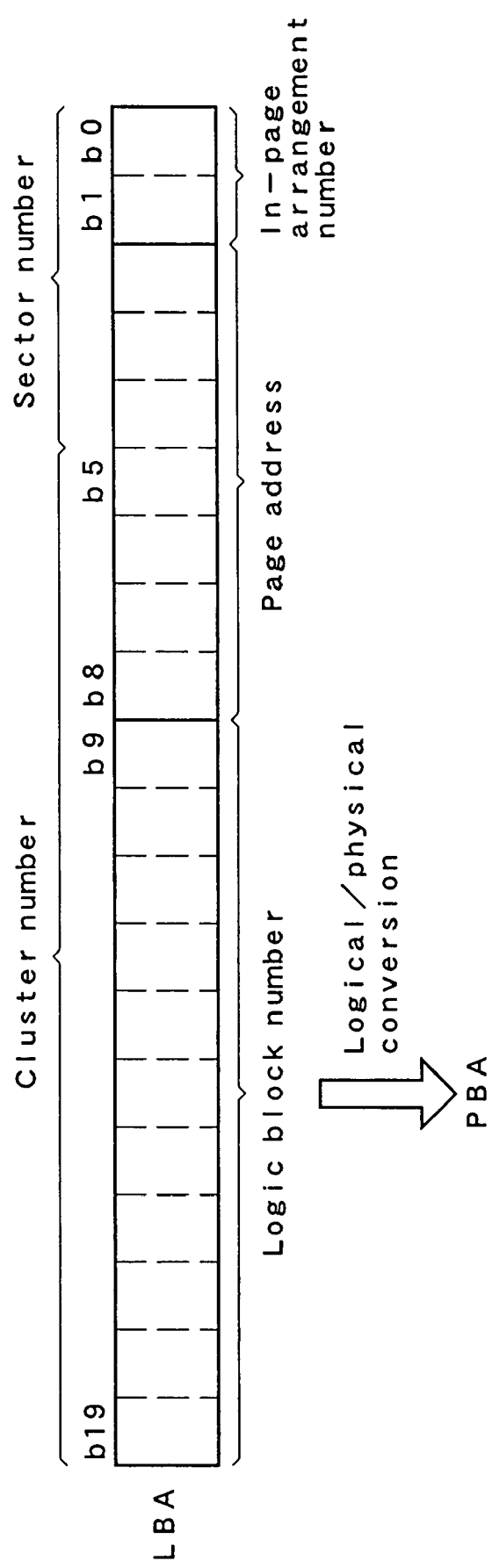
FIG. 9B is an explanatory view showing a logical address format when the access device 102 specifies to the nonvolatile memory device 101 when physical block is 128 KB.
Figure 10A:
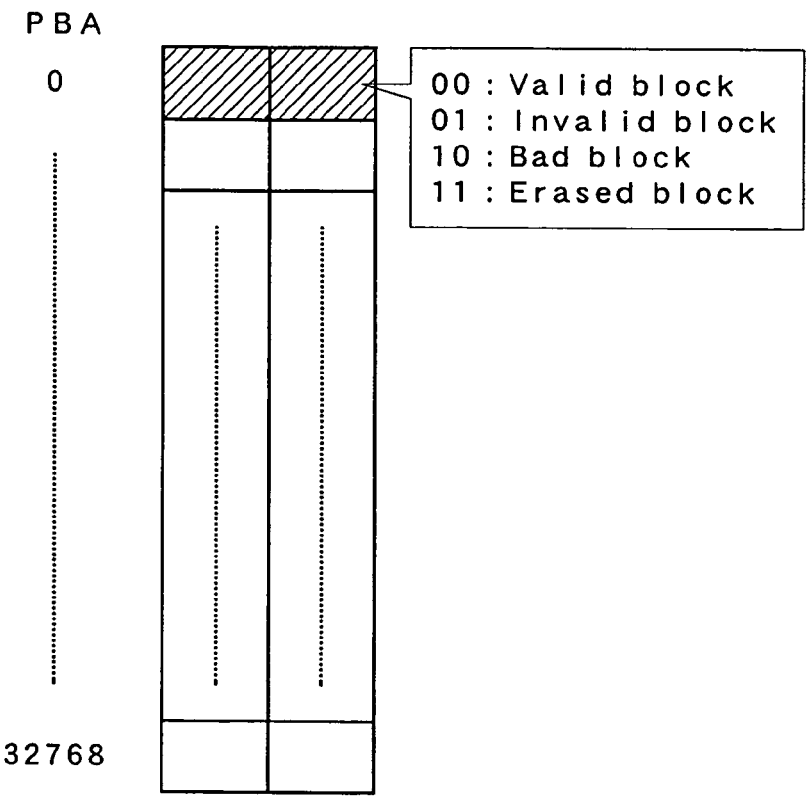
FIG. 10A is an explanatory view showing a physical management area table 133 when physical block is 16 KB.
Figure 10B:
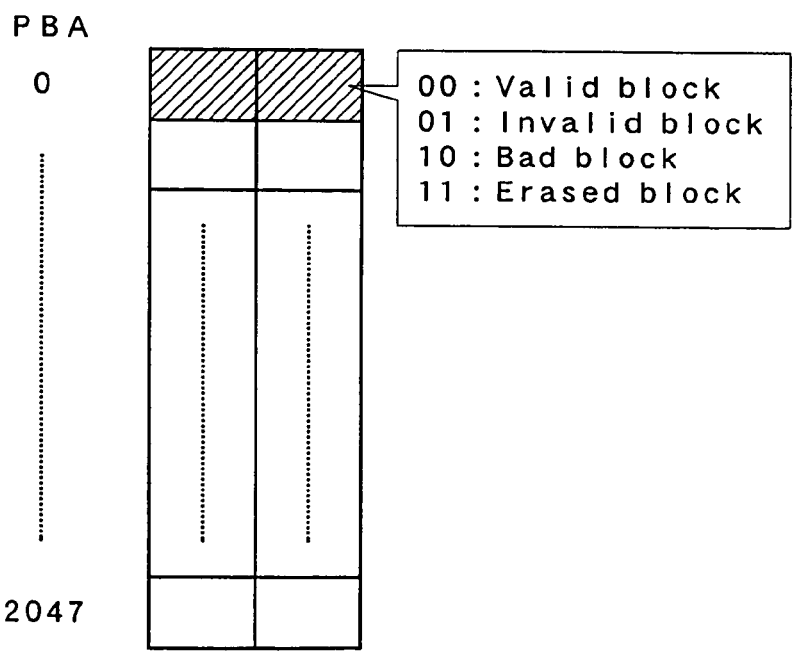
FIG. 10B is an explanatory view showing the physical management area table 133 when physical block is 128 KB.
Figure 11A:
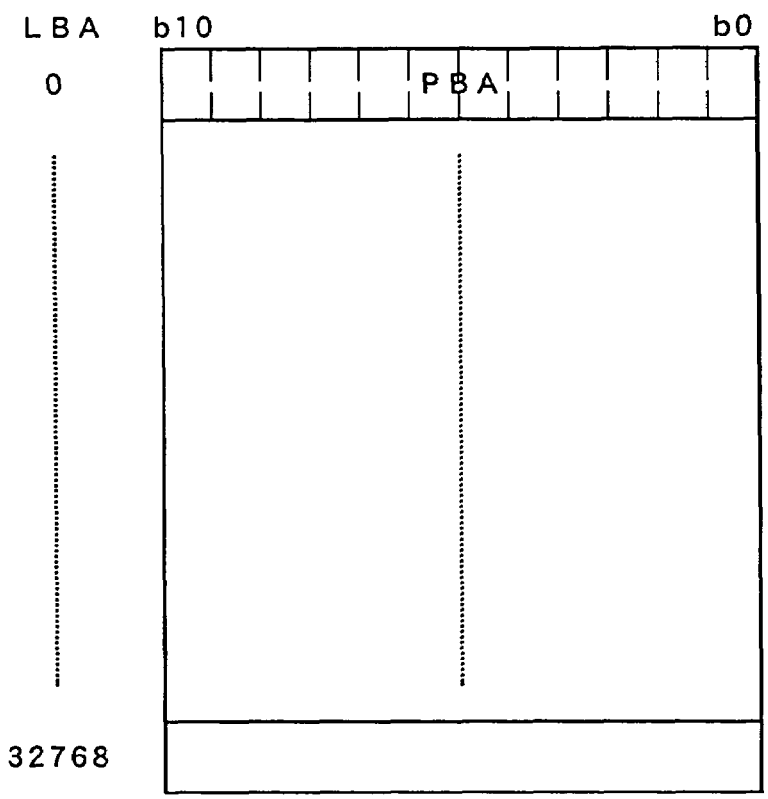
FIG. 11A is an explanatory view showing an address converting table 132 when physical block is 16 KB.
Figure 11B:
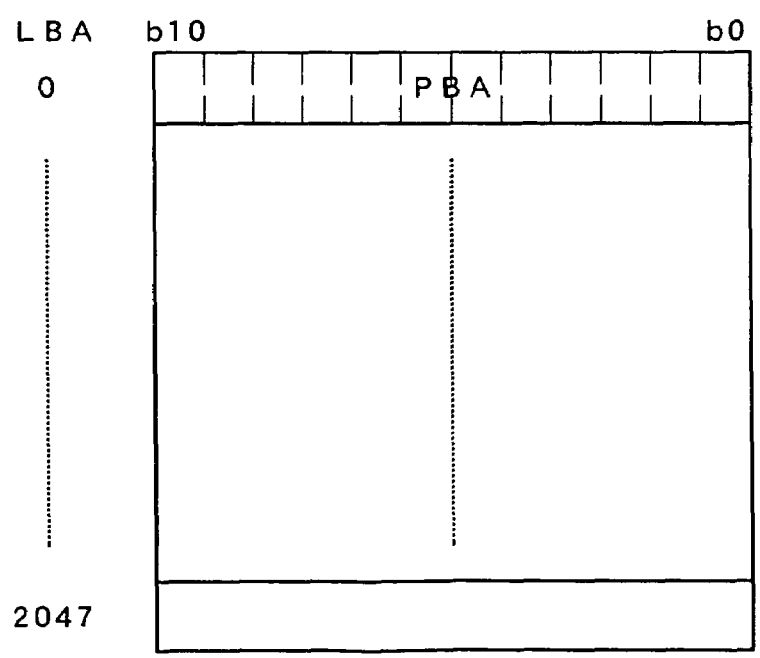
FIG. 11B is an explanatory view showing the address converting table 132 when physical block is 128 KB.
Figure 15:
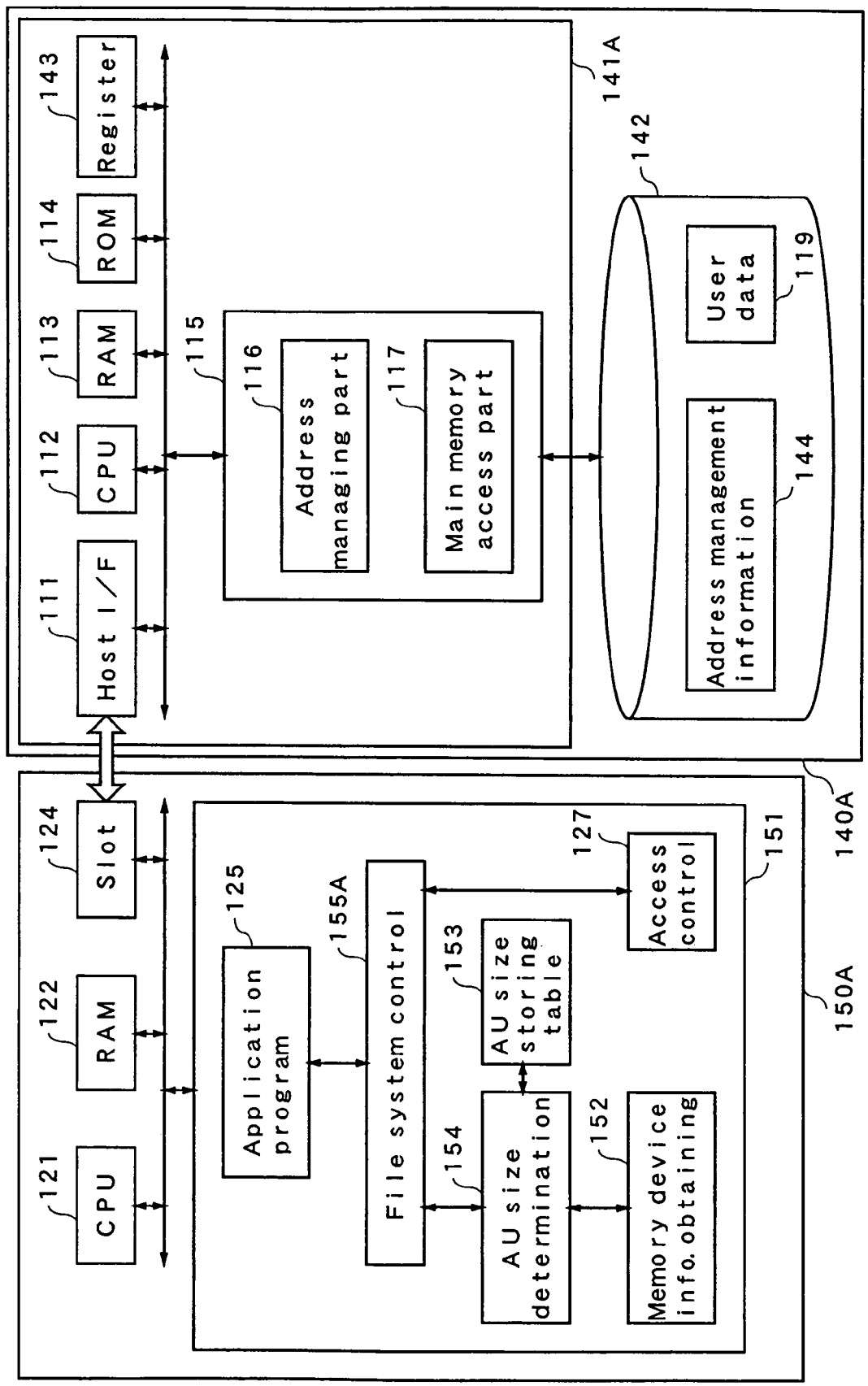
FIG. 15 is a block diagram showing a nonvolatile memory system according to a first embodiment of the present invention.

FIG. 15 is a block diagram showing the configuration of a nonvolatile memory system according to a first embodiment of the present invention. The nonvolatile memory system comprises a nonvolatile memory device 140A and access device 150A. The same components as the conventional nonvolatile memory system will be described using same reference numerals. In FIG. 15, the nonvolatile memory device 140A includes a memory controller 141A and nonvolatile main memory 142. The memory controller 141A includes a host interface 111 (the interface is described as I/F in the drawing), CPU 112, RAM 113, ROM 114, control part 115, and register 143. The host interface 111 is an interface transmitting and receiving various commands, logical address, and data between the nonvolatile memory device 140A and the access device 150A. The ROM 114 stores a program controlling the entire memory controller 141A. The program uses the RAM 113 as a temporary storage area and is operated on the CPU 112. The control part 115 is a circuit controlling a nonvolatile main memory 142 as a data storage area in the nonvolatile memory device 140A. The main memory 142 is a nonvolatile memory having a large capacity composed of a flash memory. The structure of its physical block is similar to the conventional one shown in FIG. 8B and has physical block size of 128 KB. The register 143 stores various kinds of information on the nonvolatile memory device 140A including the allocation unit size (AU size) of the main memory 142 and the storage capacity of the main memory 142.

In FIG. 15, the access device 150A accesses the nonvolatile memory device 140A and includes a CPU 121, RAM 122, ROM 151, and slot 124. The ROM 151 stores a program for controlling the access device 150A and the program uses the RAM 122 as a temporary storage area and operates on the CPU 121. The slot 124 is a connection part of the nonvolatile memory device 140A and the access device 150A. The access device 150A transmits and receives various commands, logical address, and data to/from the nonvolatile memory device 140A via the slot 124. Further, the ROM 151 includes an application program 125, file system control part 155A, access control part 127, memory device information obtaining part 152, AU size storing table 153, and AU size deciding part 154. The file system control part 155A controls each write of file data so as to write file data and a directory entry into different allocation units. The memory device information obtaining part 152 obtains the allocation unit size held in the register 143 of the nonvolatile memory device 140A and the memory device capacity of the main memory 142.

Figure 16:
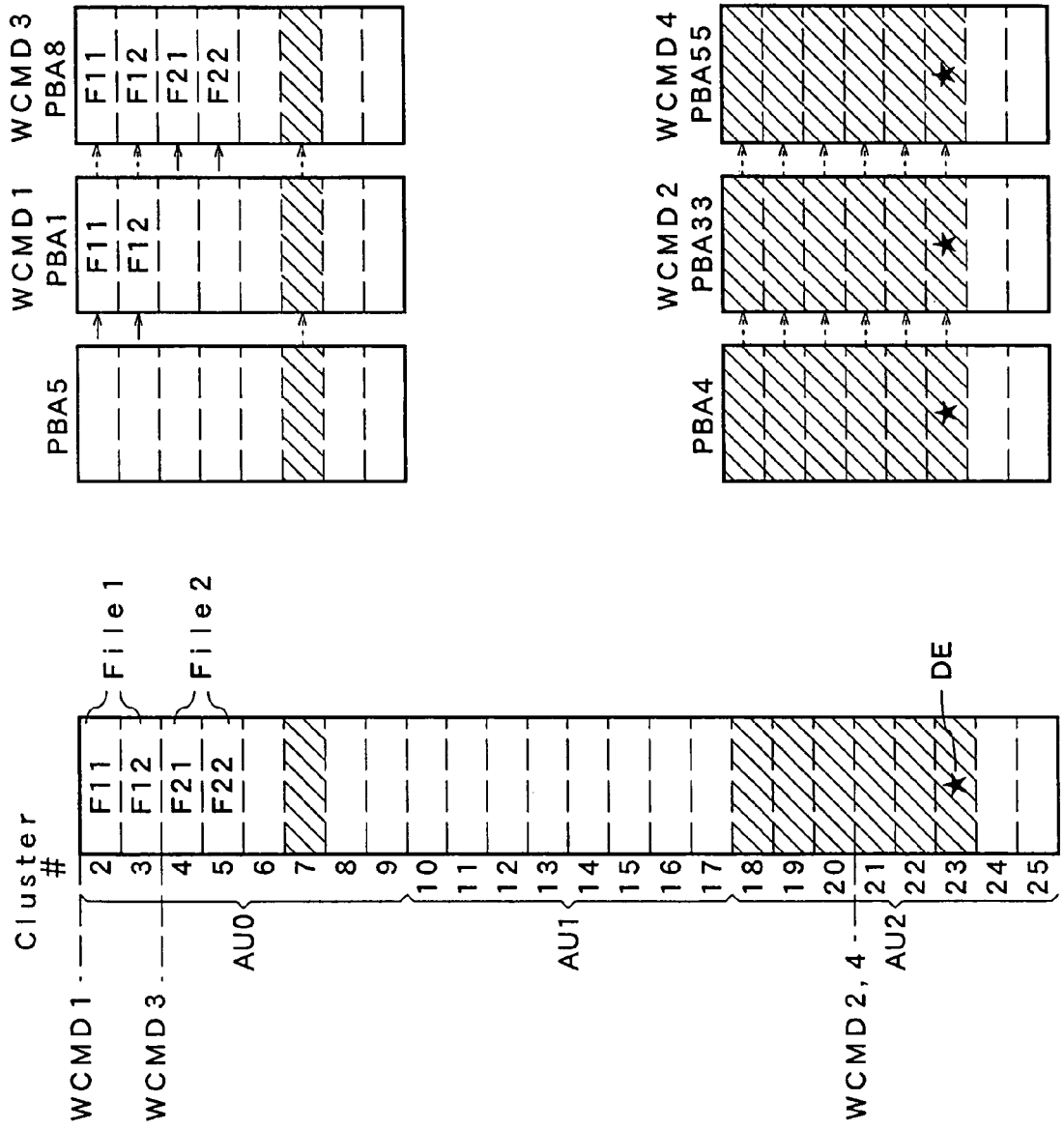
FIG. 16 is an explanatory view showing how file data and a directory entry are written into a physical block in a nonvolatile main memory 108.

FIG. 16 is an explanatory view showing how file data and a directory entry are written into the physical block in the main memory 142 when performing write into the logical address of the data area in a file system management area.

Figure 12:
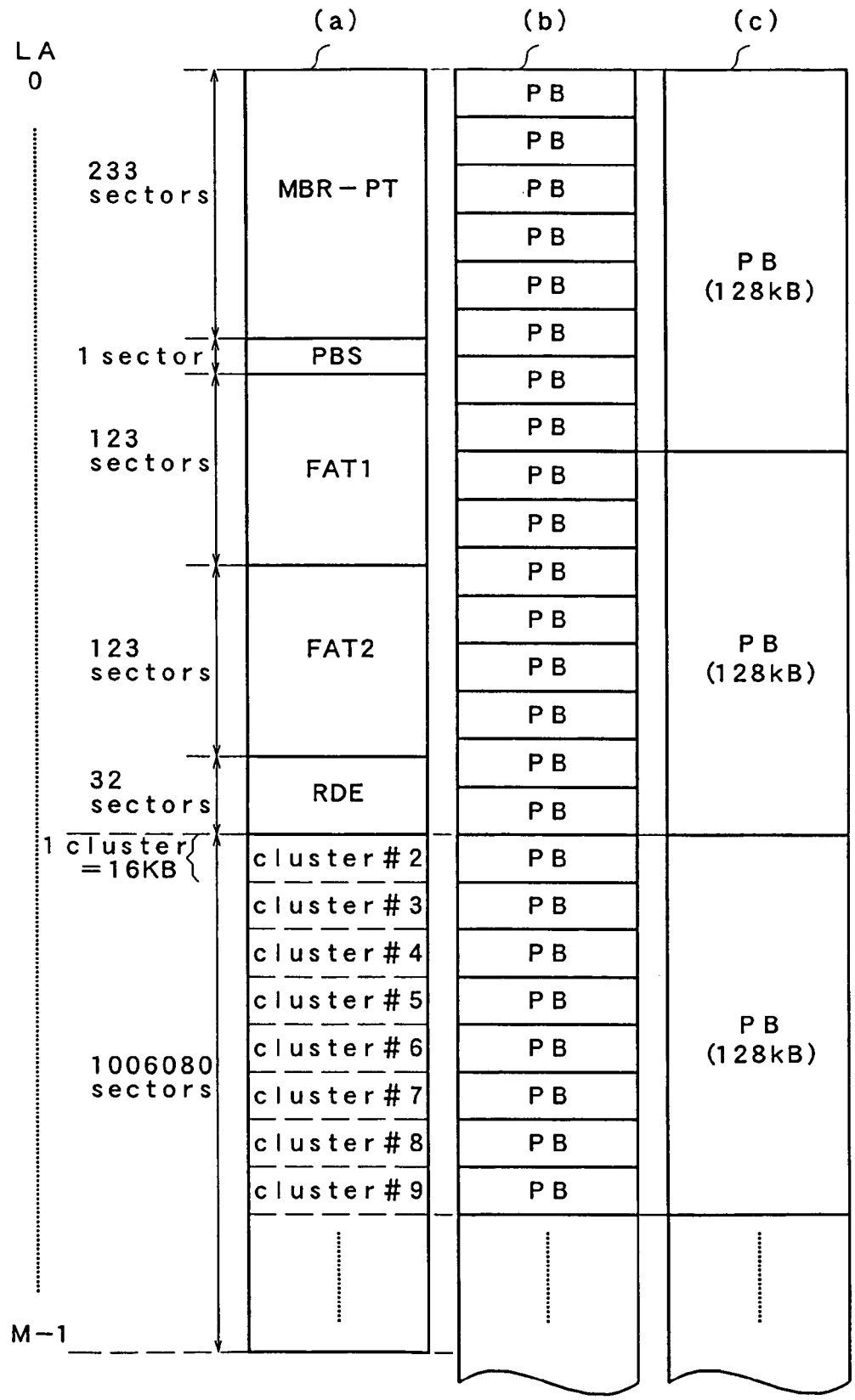
FIG. 12 is an explanatory view showing the correspondence relation between logical address arrangement and a physical block.
Figure 13:
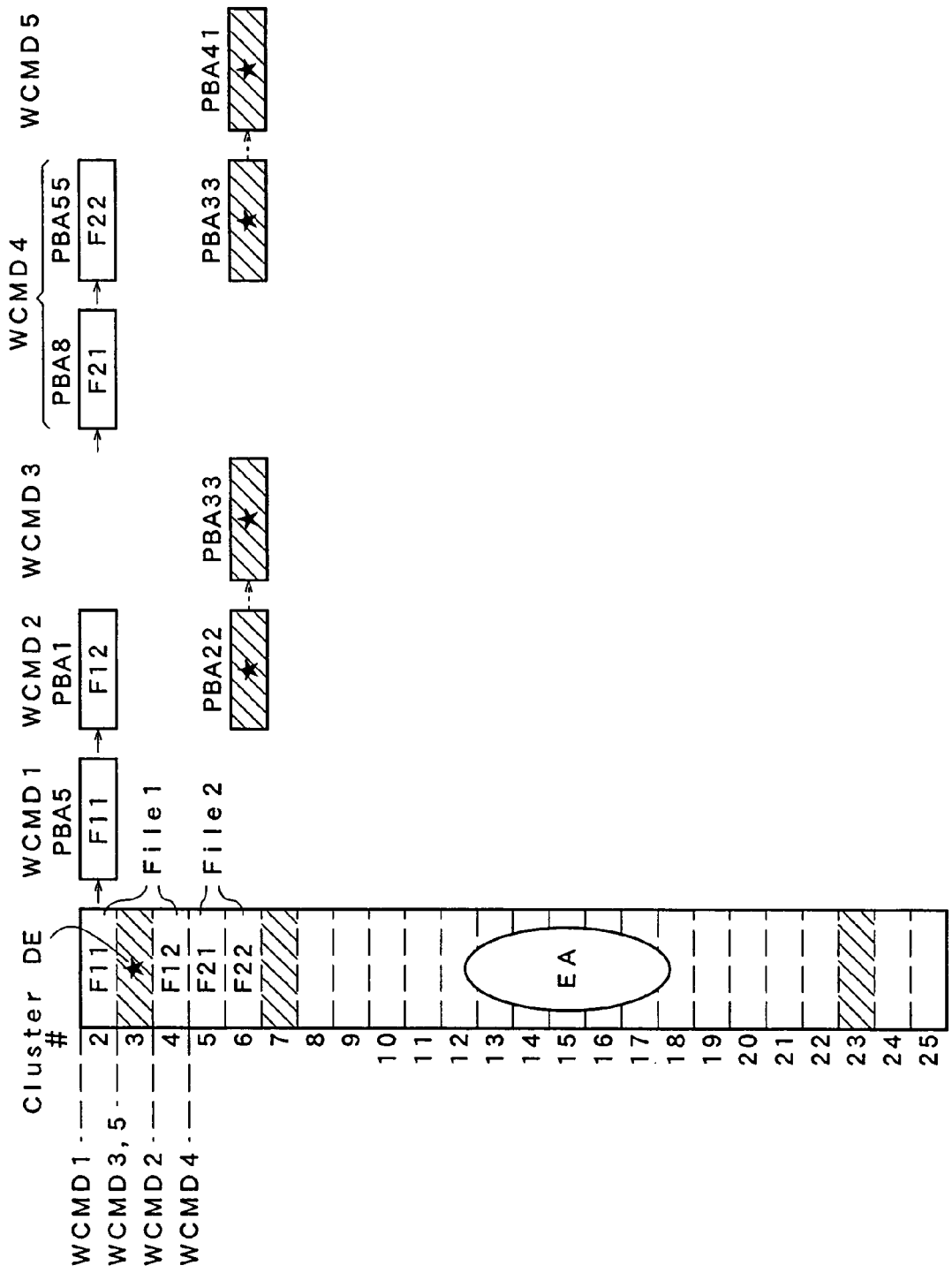
FIG. 13 is an explanatory view showing how file data and a directory entry are written into a physical block in the main memory 104 when physical block is 16 KB.

The operation of the nonvolatile memory system according to the first embodiment will be described. The operation of the entire system will be described using FIG. 15. By the access device 150A formatting the nonvolatile memory device 140A based on the FAT file system, as in the conventional nonvolatile memory system, logical address arrangement shown in (a) of FIG. 12 is configured. According to the embodiment of the present invention, the size of a management information area 601 from an MBR-PT 603 to an RDE 607 is adjusted to be set to the multiple length of cluster size. In FIG. 12, (c) shows the arrangement of the physical block of the nonvolatile memory device 140A. In either case, a data area 602 shown in FIG. 1, that is, the area starting from the cluster #2 of FIG. 12, is matched with the boundary of the physical block.

On the other hand, address management information 144 of the main memory 142 are read into an address converting table 132 and a physical area managing table 133 in the address managing part 116 by the initializing process of the CPU 112.

After such format and initialization, the access device 150A starts accessing the nonvolatile memory device 140A. At first, the memory device information obtaining part 152 obtains memory device information from the register 143 in the nonvolatile memory device 140A. The information are read from the main memory 142 into the register 143 in the initializing process. The memory device capacity always exists in the register 143, but the allocation unit size (AU size) may be stored or not depending on the nonvolatile memory device. When the AU size is stored in the register 143, the memory device information obtaining part 152 obtains the AU size. The AU size deciding part 154 decides the AU size itself the memory device information obtaining part 152 obtains from the register 143, as the AU size. On the other hand, when the AU size is not stored in the register 143, the memory device information obtaining part 152 obtains the memory device capacity. The AU size deciding part 154 refers to the AU size storing table 153 based on the memory device capacity obtained from the register 143 to obtain the maximum AU size (Max_AU_Size) and decides it as the AU size. The AU size storing table 153 stores the correspondence relation shown in Table 1.

TABLE 1

| | Memory device capacity | | |
|---|---|---|---|
| | 512 MB-1 GB | 2 GB | 4 GB-32 GB |
| Max_AU_Size | 1 MB | 2 MB | 4 MB |

In the description below, the register 143 stores allocation unit size, the allocation unit size is 128 KB. The allocation unit size needs to have a value at least physical block size. The access device 150A accesses the nonvolatile memory device 140A based on the allocation unit size decided by the above process. When the allocation unit size is not stored in the register 143 and there is not the AU size storing table 153, the memory device information obtaining part 152 may obtain the physical block size from the register 143 and decide the integral multiple of the size, as the allocation unit size.

Figure 2:
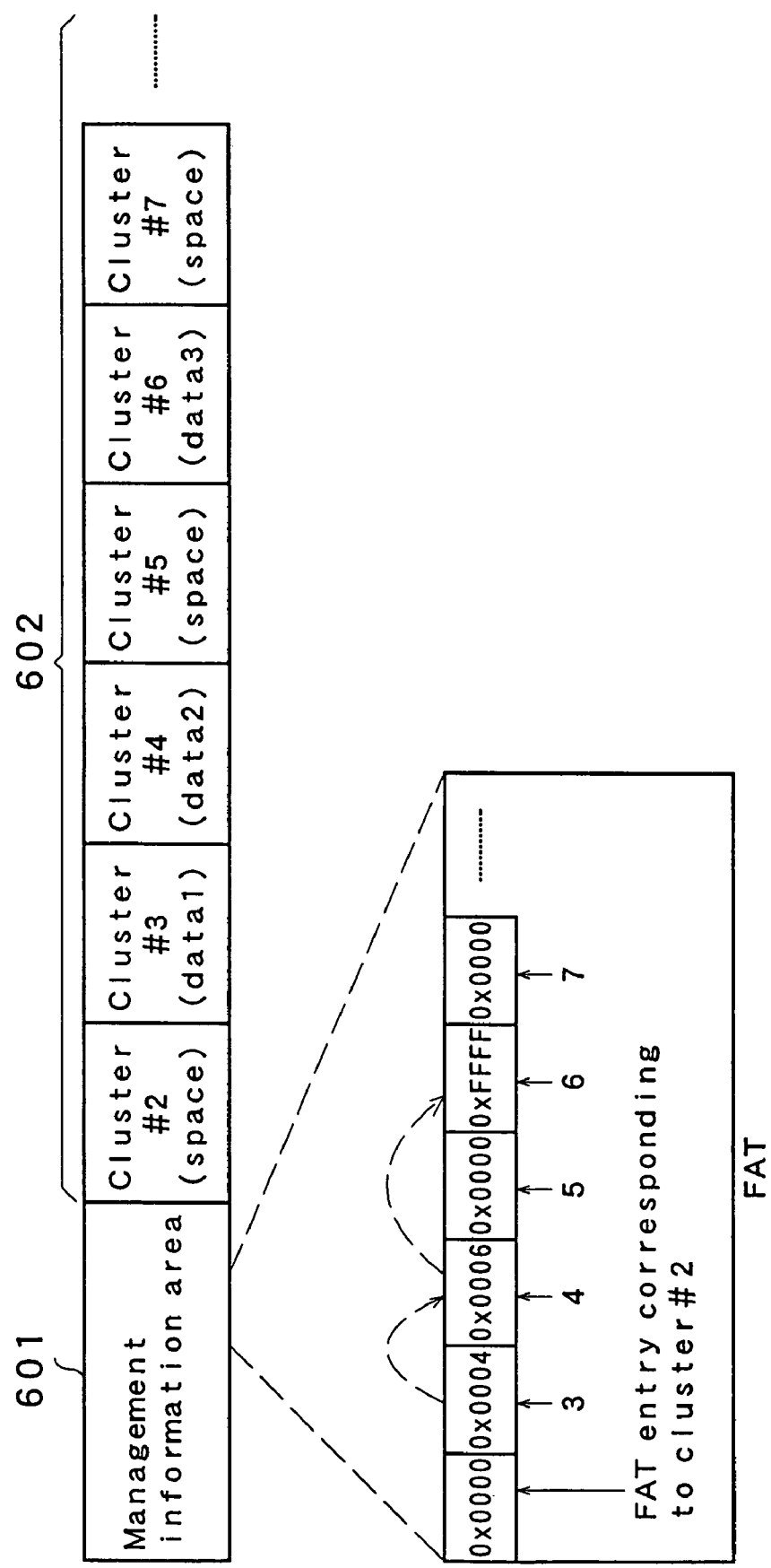
FIG. 2 is an explanatory view showing a data storing example in the FAT file system.
Figure 3:
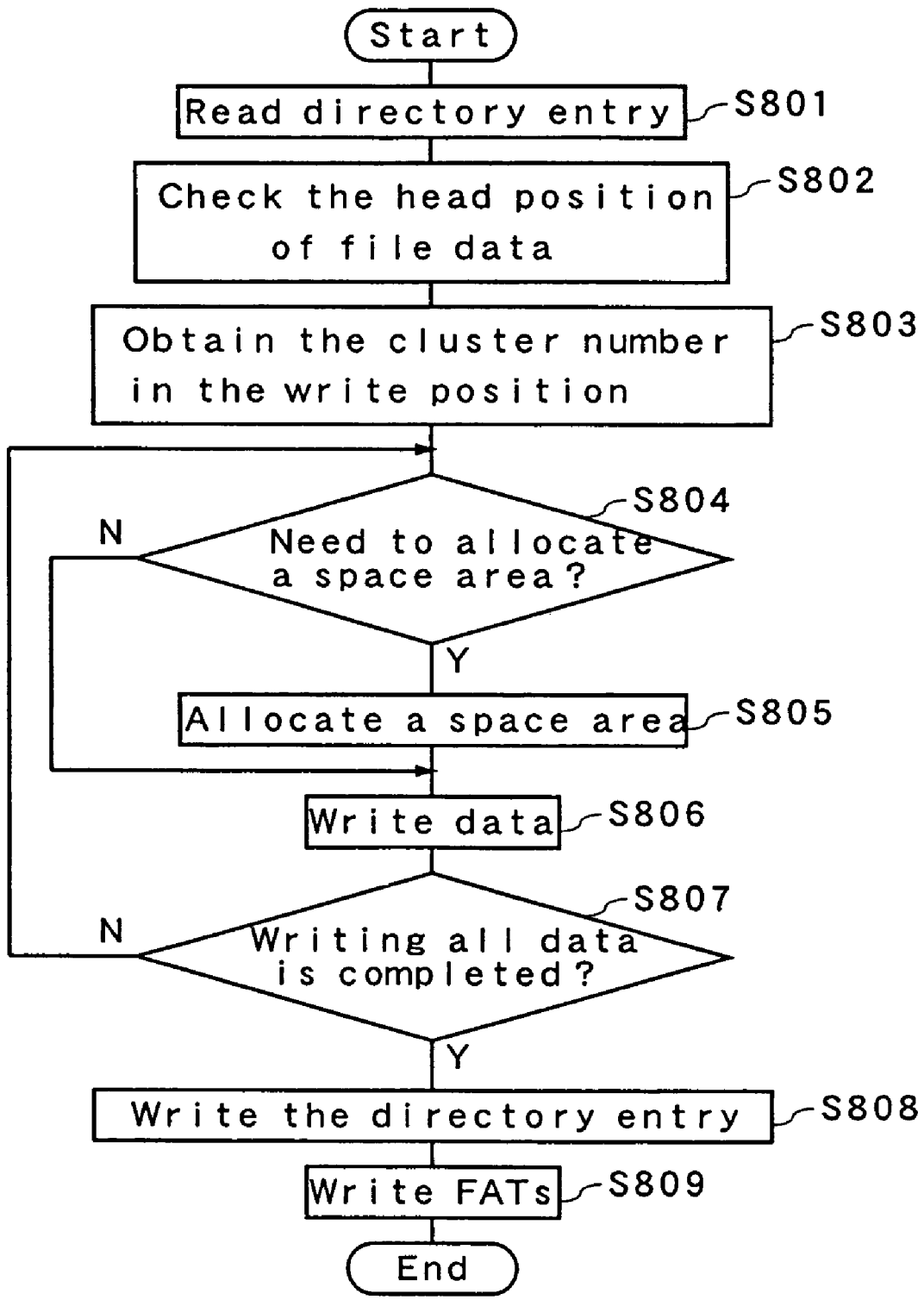
FIG. 3 is an explanatory view showing a file data write process procedure in the FAT file system.
Figure 6:
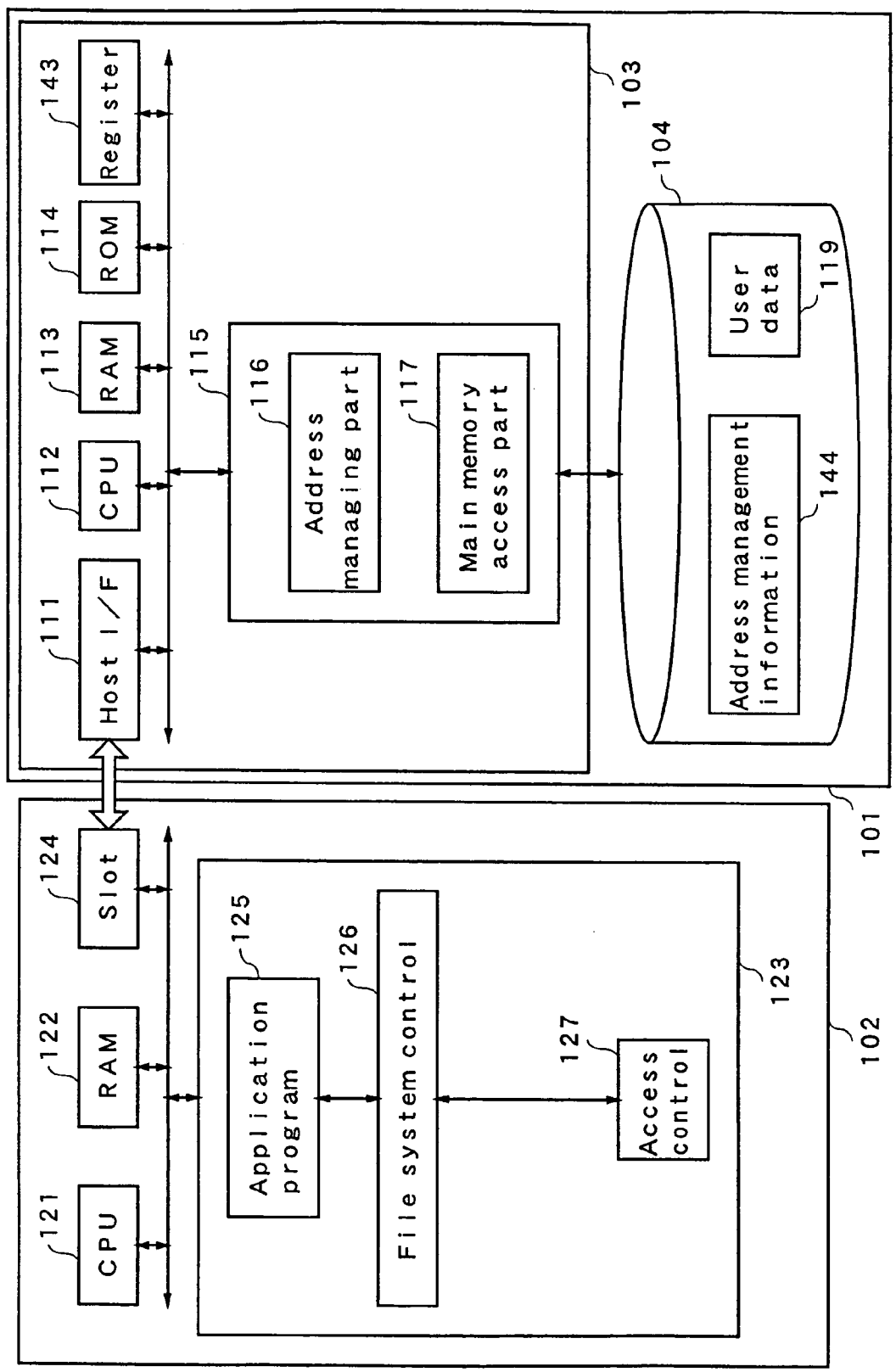
FIG. 6 is a block diagram showing a conventional nonvolatile memory system.
Figure 7:
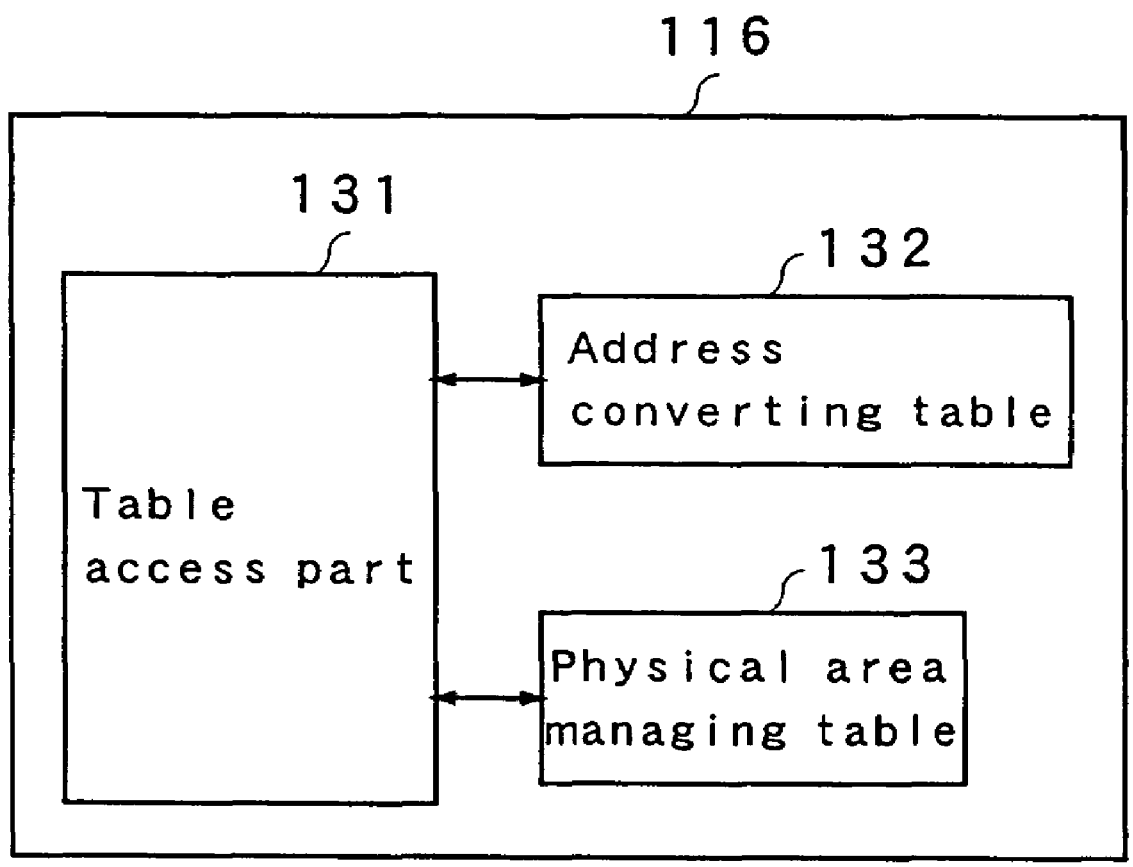
FIG. 7 is a block diagram showing an address managing part 116.

The operation will be described below by taking a write process as an example. The access control part 127 in the access device 150A sends out a write instruction into the file system control part 155A. The file system control part 155A searches a space area on FATs 605 and 606 shown in FIG. 1 and, when a space area exists, data is written into the obtained space area. At this time, the access device 150A transfers write command WCMD, predetermined logical address, and data to the nonvolatile memory device 140A. In the nonvolatile memory device 140A, the CPU 112 identifies the write command WCMD and transfer control to the control part 115. In the control part 115, the address managing part 116 decides a physical address on the written side based on the logical address transferred by the access device 150A. A table access part 131 in the address managing part 116 shown in FIG. 7 searches an erased physical block based on the physical area managing table 133 and specifies the block to a block to be written. The table access part 131 writes the address of the block written into a predetermined logical address position of the address converting table 132. Meanwhile, in searching the erased physical block of the table access part 131, there is generally provided a wear leveling function so as to minimize concentration of write or erase on a specific physical block.

Figure 14:
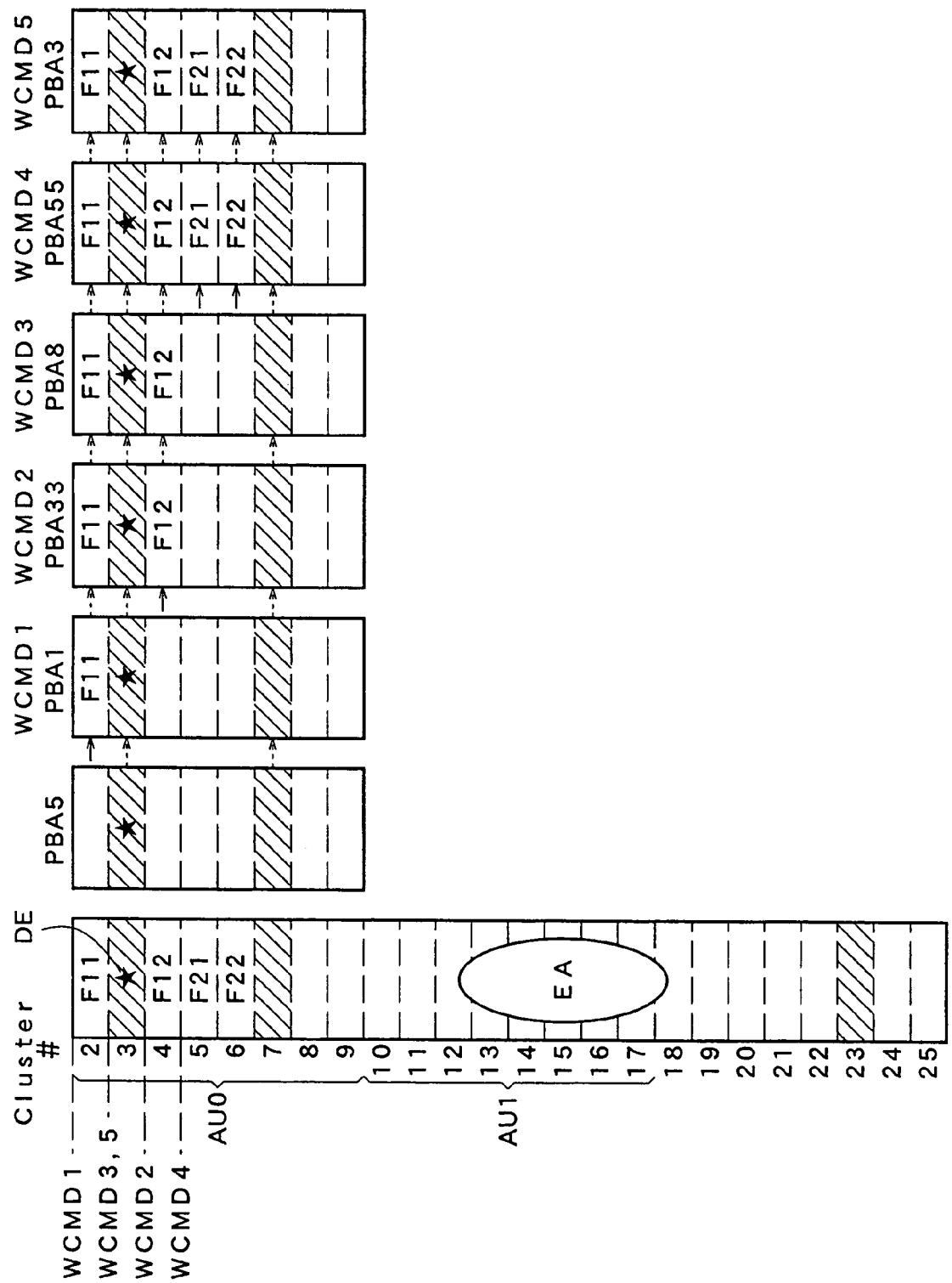
FIG. 14 is an explanatory view showing how file data and a directory entry are written into a physical block in the main memory 104 when physical block is 128 KB.

The write performance can be increased as compared with the write process in the conventional nonvolatile memory system shown in FIG. 14 by writing file data and a directory entry corresponding to the file data into different allocation units. This will be described using FIG. 16.

At first, the file system control part 155A searches a space cluster. The file system control part 155A arranges file data and a directory entry in different allocation units. Here, files 1 and 2 are arranged in allocation unit AU0 and a directory entry is arranged in allocation unit AU2. To compare the performance with the write process of the conventional nonvolatile memory system shown in FIG. 14, the prerequisites need to be matched. In FIG. 14, in updating the directory entries, that is, WCMD3 and WCMD5, in the update process of the WCMD3, three clusters 2, 4, and 7 are copied, and in the update process of the WCMD5, five clusters 2, 4, 5, 6, and 7 are copied. Accordingly, in the write process of the nonvolatile memory system of the first embodiment shown in FIG. 16, in the update of the directory entries, if in the state that five clusters are copied, which is enough for the prerequisites for comparison. For that reason, clusters 18 to 22 are clusters in use.

F11 and F12 as components of the file 1 and F21 and F22 as components of the file 2 are written into the space clusters 2 to 5 searched by the file system control part 155A. As, unlike FIG. 14, a directory entry does not exist in the cluster 3, that is, a space continuous area can be easily secured, the files 1 and 2 can be both written continuously. The cluster 7 in use is assumed to be written into physical block PBA5. According to the write process of the F11 and F12, the F11 and F12 are stored in erased physical block PBA1 searched by the address managing part 116, and data stored in the PBA5 is copied to PBA1. On the other hand, the directory entry existing in the allocation unit AU2 is assumed to be written into PBA4. Corresponding to write of the file 1 by WCMD1, the directory entry is written into PBA33 by WCMD2. At this time, data existing in the clusters 18 to 22 are also copied. In the same manner, write and copy to the physical block are performed according to write of each file.

Table 2 shows the write performance of the prior art and the first embodiment.

TABLE 2

| Comparison of write performance | Number of write | Number of copy |
|---|---|---|
| Conventional nonvolatile memory system | 4 | 19 |
| Nonvolatile memory system of first embodiment | 4 | 16 |

In the conventional nonvolatile memory system, the number of write is four and the number of copy is 19. On the other hand, in the nonvolatile memory system of the first embodiment, the number of write is four and the number of copy is 16. More specifically, the nonvolatile memory system of the first embodiment increases the write performance by the number of copy by three. The factor of increasing the performance is that file data and a directory entry corresponding to the file data are written into different allocation units so that the file 1 can be written continuously. The copy has two processes of read and write so that the process time of the copy is longer than that of the write. In FIG. 16, the cluster 7 is a cluster in use, but the cluster may store a directory entry corresponding to a file other than the files 1 and 2. That is, file data and a directory entry corresponding to file data different from the file data may be stored in the same allocation unit. This can increase the write performance when recording plural file data at the same time. When the file system control part 155A selectively uses only the allocation unit in which a fixed space area exists, the file data can be easily written continuously, and thereby the write performance is to be increased.

Second Embodiment

Figure 17:
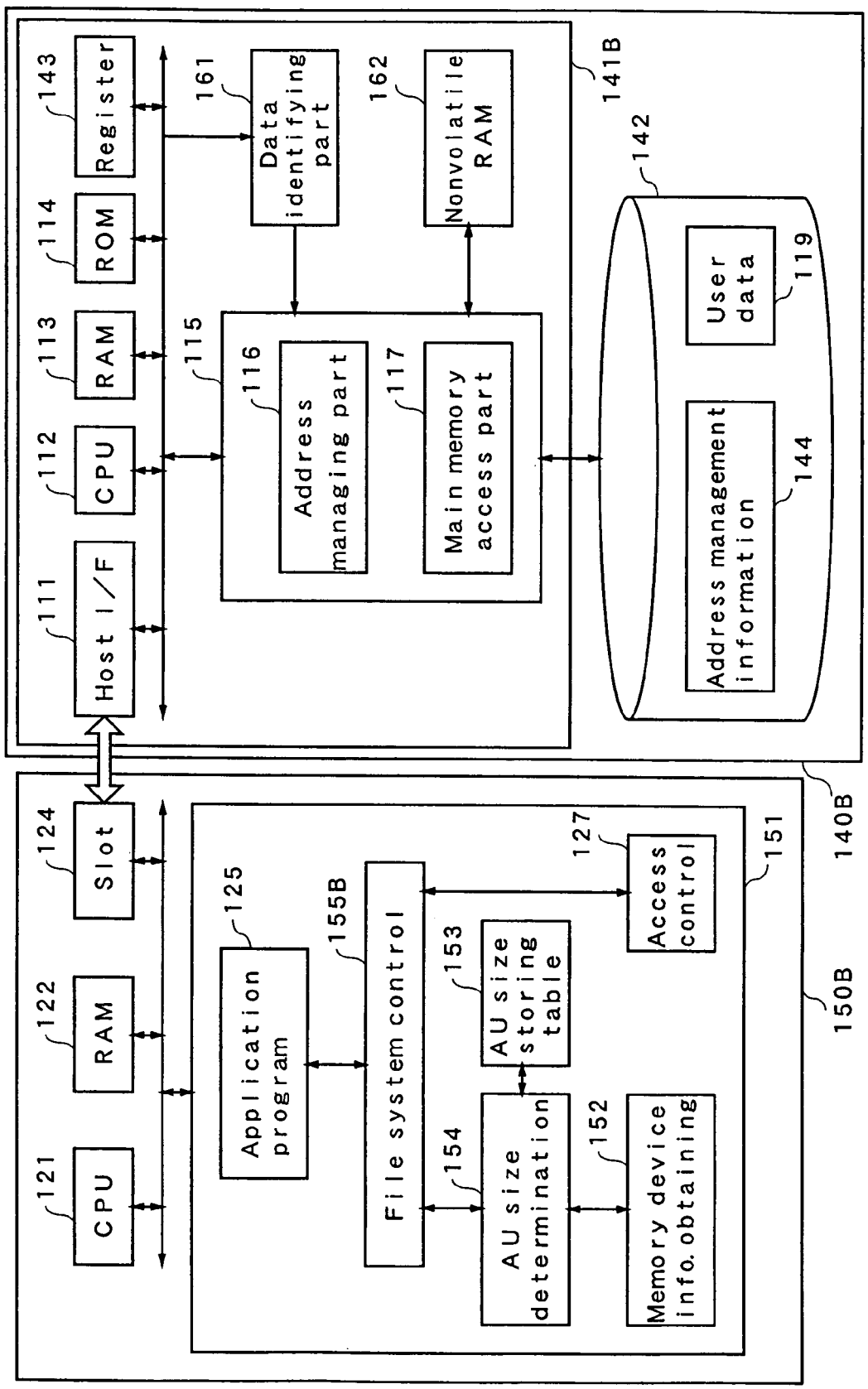
FIG. 17 is a block diagram showing a nonvolatile memory system according to a second embodiment of the present invention.

A second embodiment of the present invention will be described using FIG. 17. In this embodiment, a data identifying part 161 and nonvolatile RAM 162 are added to a memory controller 141B, and an access device 150B has a file system control part 155B. Unlike the file system control part 155A of the first embodiment, the file system control part 155B always writes a directory entry as file system management information into a specific allocation unit, here as AU2. Other configuration is similar to the first embodiment.

The data identifying part 161 is a block identifying whether data transferred by the access device 150B in a write process is file data or a directory entry as file system management information.

The nonvolatile RAM 162 is a nonvolatile auxiliary memory storing a directory entry having a capacity smaller than file data. The auxiliary memory preferably has a write speed higher than that of a main memory 142. The nonvolatile RAM is a nonvolatile random access memory having the assured rewrite number larger than that of the main memory and enabling overwrite. For the nonvolatile RAM 162, it is preferable to use a ferroelectric memory (FeRAM) disclosed in JP-A 07-281842, magnetic recording type random access memory (MRAM), Ovonic unified memory (OUM), and resistance RAM (RRAM), etc. A nonvolatile RAM having hundreds of KB is practically used at present, and a nonvolatile RAM having a larger capacity is being put to practical use in the future.

Figure 18:
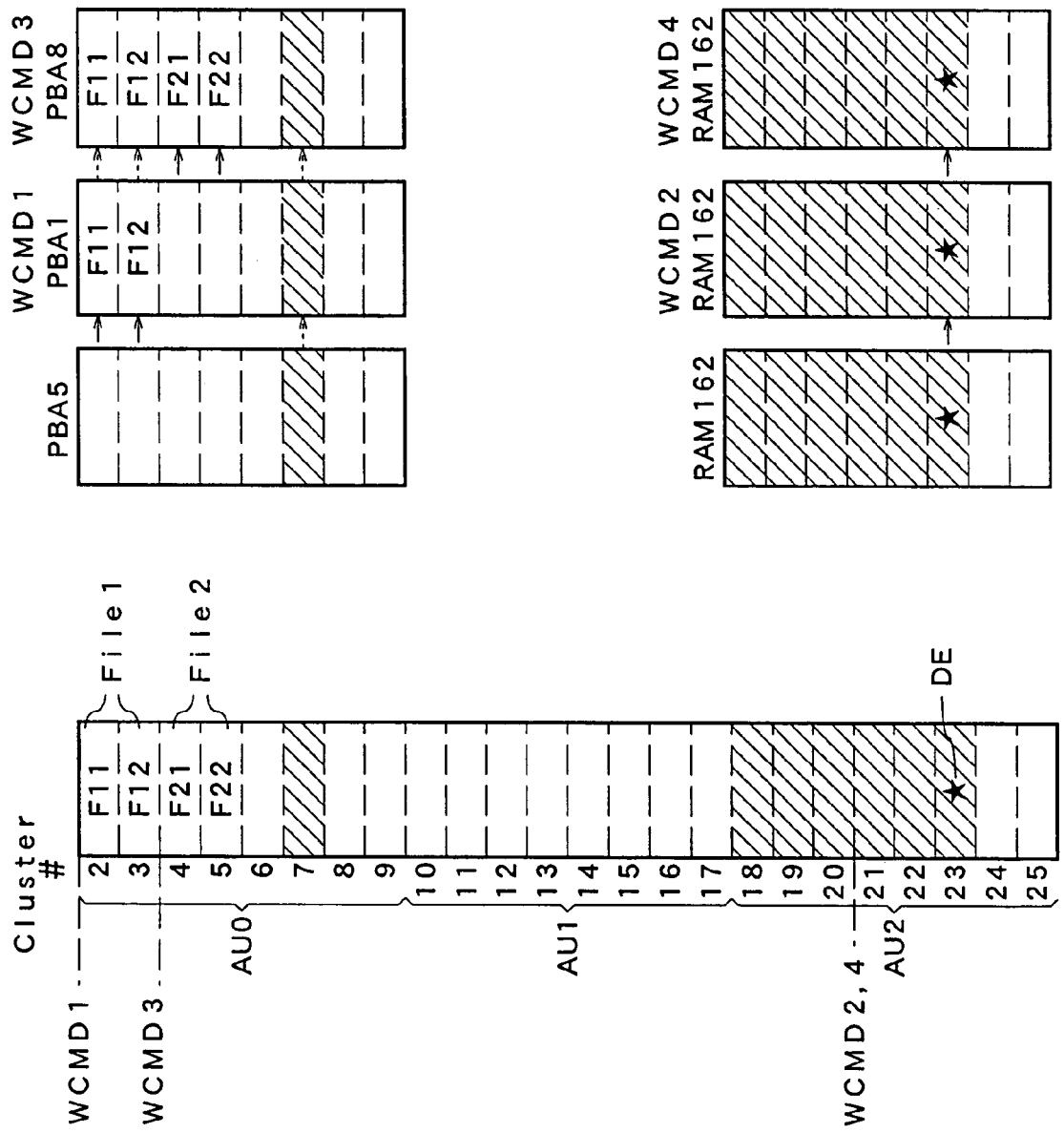
FIG. 18 is an explanatory view showing how file data and a directory entry are written into a physical block into a main memory 143 or a nonvolatile RAM 162.

FIG. 18 is an explanatory view showing how file data is written into a physical block of the main memory 142 and how a directory entry is written into the nonvolatile RAM 162 when performing write to the logical address of the data area in the file system management area.

FIG. 19 shows a memory map of the nonvolatile RAM 162. The nonvolatile RAM 162 has a total capacity of 128 KB and has a storage area for 256 directory entries each of which is 512 bytes.

The operation of the second embodiment, the write performance furthermore increases than that of the first embodiment by controlling read and write of only the directory entry on the nonvolatile RAM 162, will be described. The point enabling higher performance is to use a method in which copy does not occur for each update of the directory entry. When some sectors of the physical block are rewritten as did in FIG. 16, the nonvolatile memory need not to copy other sectors to other physical blocks. Like a random access memory RAM, rewrite can be done without performing a specific address operation. Based on FIG. 18, the allocation unit AU2 is an area to which only a directory entry is allocated, and the directory entry corresponding to write of the files 1 and 2 with an address indicated by a star mark, that is, 512 bytes are written. Corresponding thereto, rewrite for 512 bytes occurs on the nonvolatile RAM 162, but, as described above, as the nonvolatile RAM 162 is a memory enabling overwrite, the address indicted by a star mark, that is, 512 bytes may be simply rewritten for each occurrence of the write commands WCMD2 and WCMD4.

Table 3 shows the comparison of the flash memory as the nonvolatile main memory with the nonvolatile RAM as an auxiliary memory. As shown in Table 3, the flash memory has the assured rewrite number of 100,000, while the nonvolatile RAM has an extraordinary assured rewrite number of 10 billions, which is not a problem for life. The reason will be described in detail.

TABLE 3

|  | Flash memory | Nonvolatile RAM |
|---|---|---|
| Memory type | Nonvolatile (10 years) | Nonvolatile (10 years) |
| Data rewrite unit | Sector (512 bytes) | 1 byte |
| Write cycle | Hundreds of μs to 1 ms | 100 ns |
| Assured rewrite number | 100,000 | 10 billions |

When a flash memory for 1 GB is mounted as the main memory 142 and file data is rewritten by one write command for each cluster, that is, for a 16 KB unit in a FAT 16, write commands are issued about 64 K times to rewrite the total capacity for 1 GB.

$$1 \text{ GB} \div 16 \text{ KB} = 64 \text{ K times} \quad (1)$$

On the other hand, corresponding to the rewrite of file data, one directory entry is rewritten 64 K times. Rewriting all physical blocks of the flash memory once corresponds to rewriting a specific 512 B area of the nonvolatile RAM 162 64 K times. This is the worst conditions in the nonvolatile RAM 162. According to Table 3, the assured rewrite number of the flash memory is 100,000. From the following expression (2), when the flash memory is rewritten 100,000 times, the nonvolatile RAM 162 is rewritten 6.4 billion times.

$$64 \text{ K times} \times 100,000 \text{ times} = 6.4 \text{ billion times} < 10 \text{ billion times} \quad (2)$$

According to Table 3, the value is smaller than the assured rewrite number of 10 billions of the nonvolatile RAM. The life of the flash memory is not very different from that of the nonvolatile RAM 162. The number of rewrite of the nonvolatile RAM 162 is not a problem for life.

According to Table 3, as the write cycle per byte of the nonvolatile RAM is about 100 ns, it is about 50 μs when writing the directory entry of 512 bytes once. It cannot exceed the write cycle of the flash memory. Time to rewrite the directory entry once, therefore, may be almost equal.

Table 4 shows the comparison of the write performance between the prior art and the second embodiment. As the number of copy in the second embodiment is absolutely lower, the write performance of the second embodiment is found to be higher.

TABLE 4

| Comparison of write performance | Number of write | Number of copy |
|---|---|---|
| Conventional nonvolatile memory system | 4 | 19 |
| Nonvolatile memory system of second embodiment | 6 | 4 |

Two identifying methods of the data identifying part 161 according to the second embodiment will be described. In the first method, information showing data kind is specified by the argument of the write command when the access device 150B writes file data into the nonvolatile memory device 140B. The write command has a form of Write (size, addr, data_kind), the size expresses a write size, the addr expresses a write address, and the arguments are the conventional arguments. The present embodiment has the feature that the argument has data_kind. The data_kind specifies file data or a directory entry as data kind handed to the write command. The data_kind, for instance, is a flag of 1 bit, the data identifying part 161 judges file data when the data_kind has a value of 0 and judges a directory entry when the data_kind has a value of 1, thereby sending out a control signal to the control part 115.

In the second method, two kinds of write commands of Write (size, addr) and Write_DE (size, addr) are provided in which the former is file data and the latter is the write command for directory entry. All other than the directory entry such as the FATs 605 and 606 may use Write (size, addr). In this method, the CPU 162 identifies a command transferred by the access device 150B, and the data identifying part 161 judges whether the command is Write (size, addr) or Write_DE (size, addr) and sends out a control signal to the control part 115.

The data identifying part 161 identifies data accessed from the access device as file data or a directory entry. The control part 115 accesses the main memory 142 when identifying it as data and accesses the nonvolatile RAM 162 when identifying it as a directory entry.

In the second embodiment, the capacity of the nonvolatile RAM 162, however, is 128 KB. Since one allocation unit size can be larger than 128 KB, a nonvolatile RAM having a capacity larger than 128 KB is preferably mounted. The nonvolatile RAM 162 may not be incorporated into the memory controller 141B and may be provided in the outside of the memory controller 141B.

As described above, in the second embodiment, when the access device 150B writes file data into the nonvolatile memory device 140B, the file system control part 155B writes file data and a directory entry into different allocation units, that is, different physical blocks. Therefore, the file data can be easily written continuously and the number of file copy can be reduced at updating a directory entry. Further, as the file system control part 155B performs control to store all directory entries into a specific allocation unit, identifies according to whether data to be written is file data or a directory entry, and performs write into the main memory and the auxiliary memory, the write speed can be significantly increased.

Although, in the second embodiment, the allocation unit is written into the auxiliary memory, the directory entry may be written into the physical block of the main memory.

Third Embodiment

Next, a third embodiment of the present invention will be described using FIGS. 20 and 21. A nonvolatile memory device 140C according to this embodiment uses a nonvolatile memory 171 which can write to add data as a nonvolatile main memory. A second control part 172 is provided with a memory controller 141C in addition to the first control part 115. The second control part 172 is a control part for writing a directory entry into a predetermined allocation unit of the nonvolatile memory 171. The first control part 115 and second control part 172 are control parts for controlling the nonvolatile memory 171 as the data storage area in the nonvolatile memory device 140C. A bus switching part 173 switches data and address management information between the first control part 115 and the second control part 172. A selector 174 is a selector for switching writing of data written from the first and second control parts into the main memory 171. The structure of the physical block of the nonvolatile memory 171 is similar to the conventional one shown in FIG. 8B.

Figure 20:
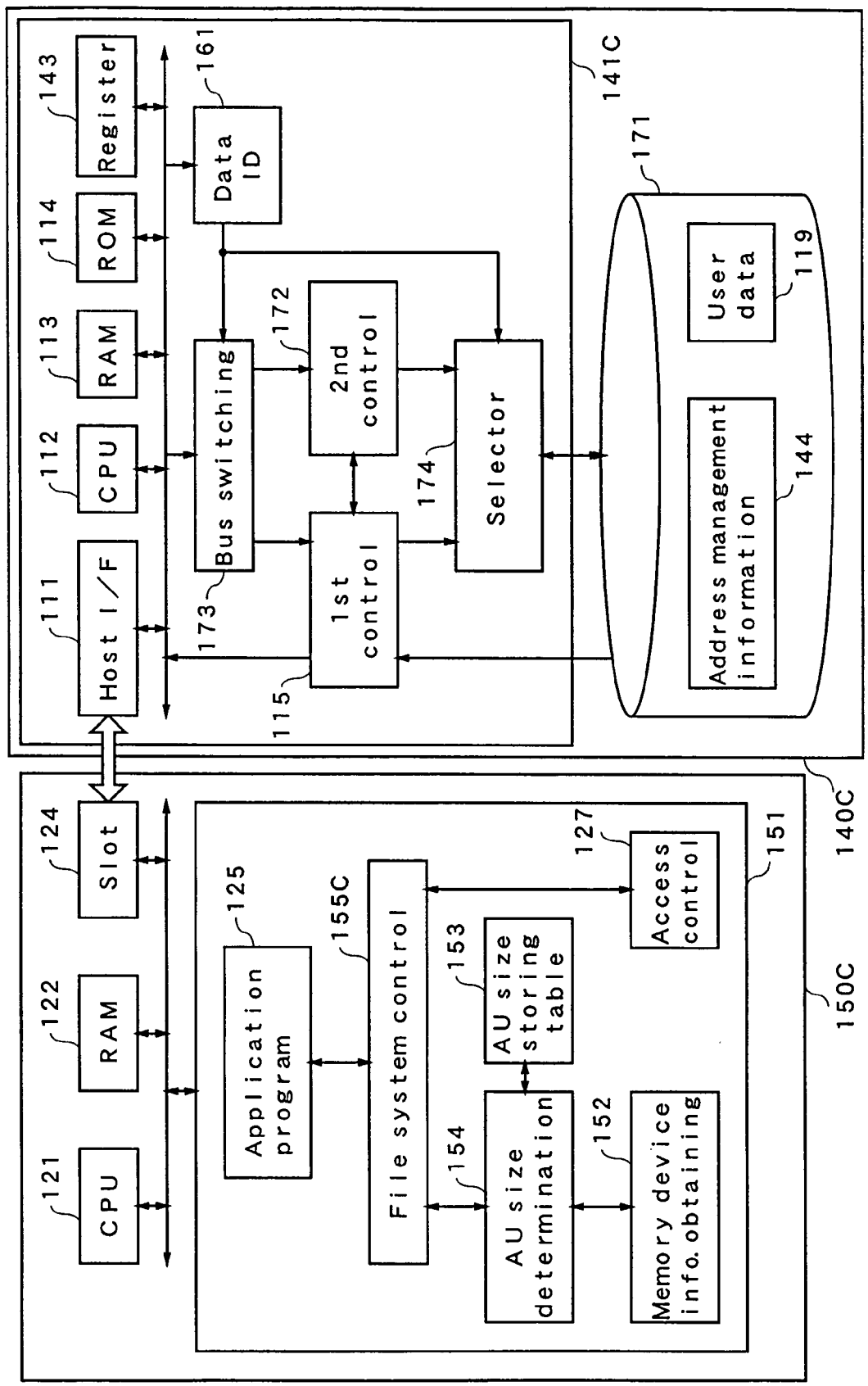
FIG. 20 is a block diagram showing a nonvolatile memory system according to a third embodiment of the present invention.

On the other hand, in FIG. 20, an access device 150C accessing the nonvolatile memory device 140C is similar to the nonvolatile memory system of the first embodiment except for the operation of a file system control part 155C. The same components of the prior art or above-described nonvolatile memory system are indicated by same reference numerals and the detailed description is omitted.

Figure 21:
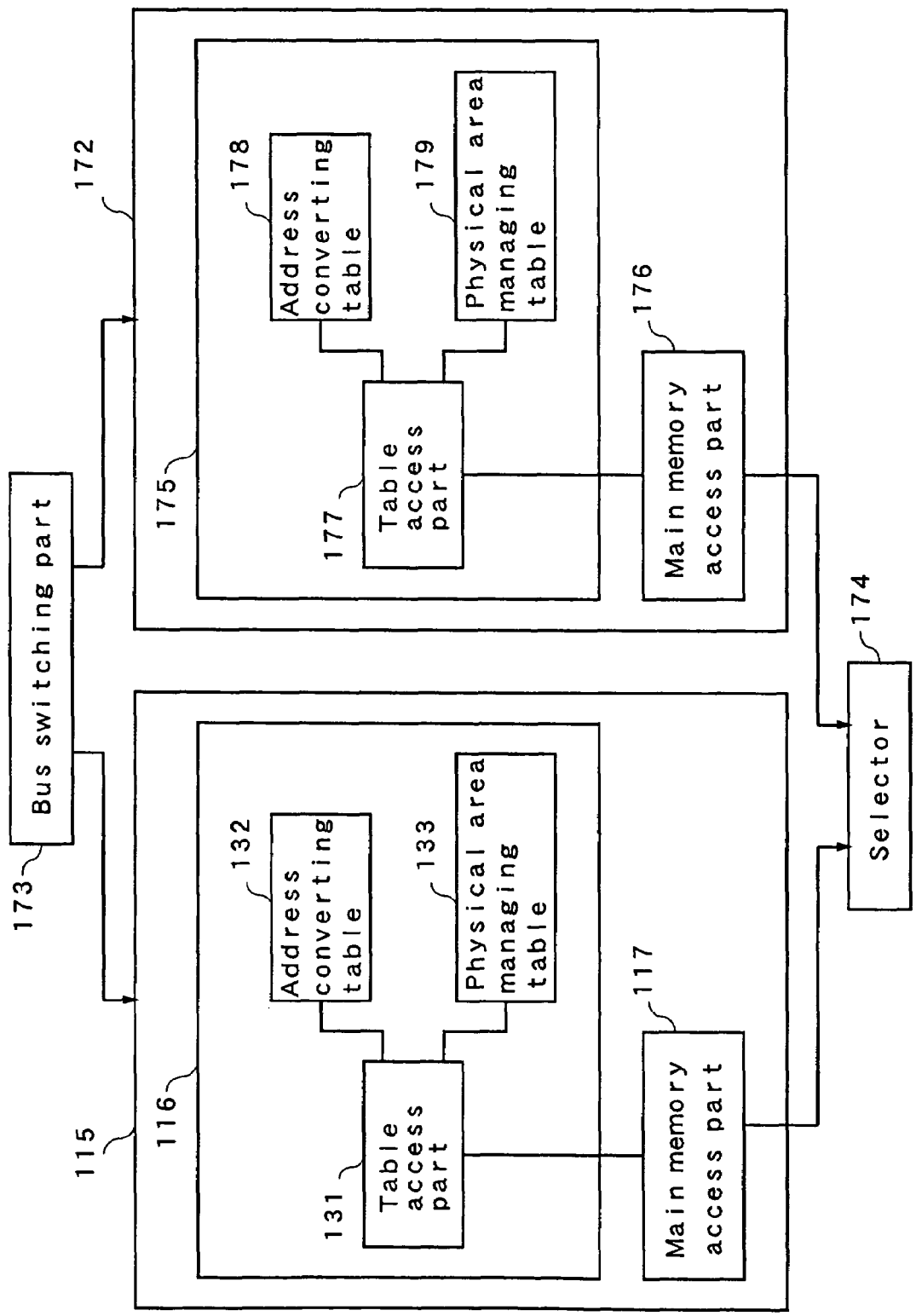
FIG. 21 is a block diagram showing first and second control parts and peripheral circuits thereof.

FIG. 21 is a diagram showing the detailed configuration of the peripheral portions of the first and second control parts 115 and 172. The first control part 115 is the same as the control part 115 of the first embodiment. In almost the same manner, the second control part 172 has a second address managing part 175 and second main memory access part 176. The address managing part 175 accesses a table access part 177, address converting table 178 connected thereto, and physical area managing table 179. The main memory access part 176 accesses the main memory 171 via the selector 174, and writes a directory entry. The second control part 172 is a write to add type and a block for performing write control of a directory entry.

Figure 22:
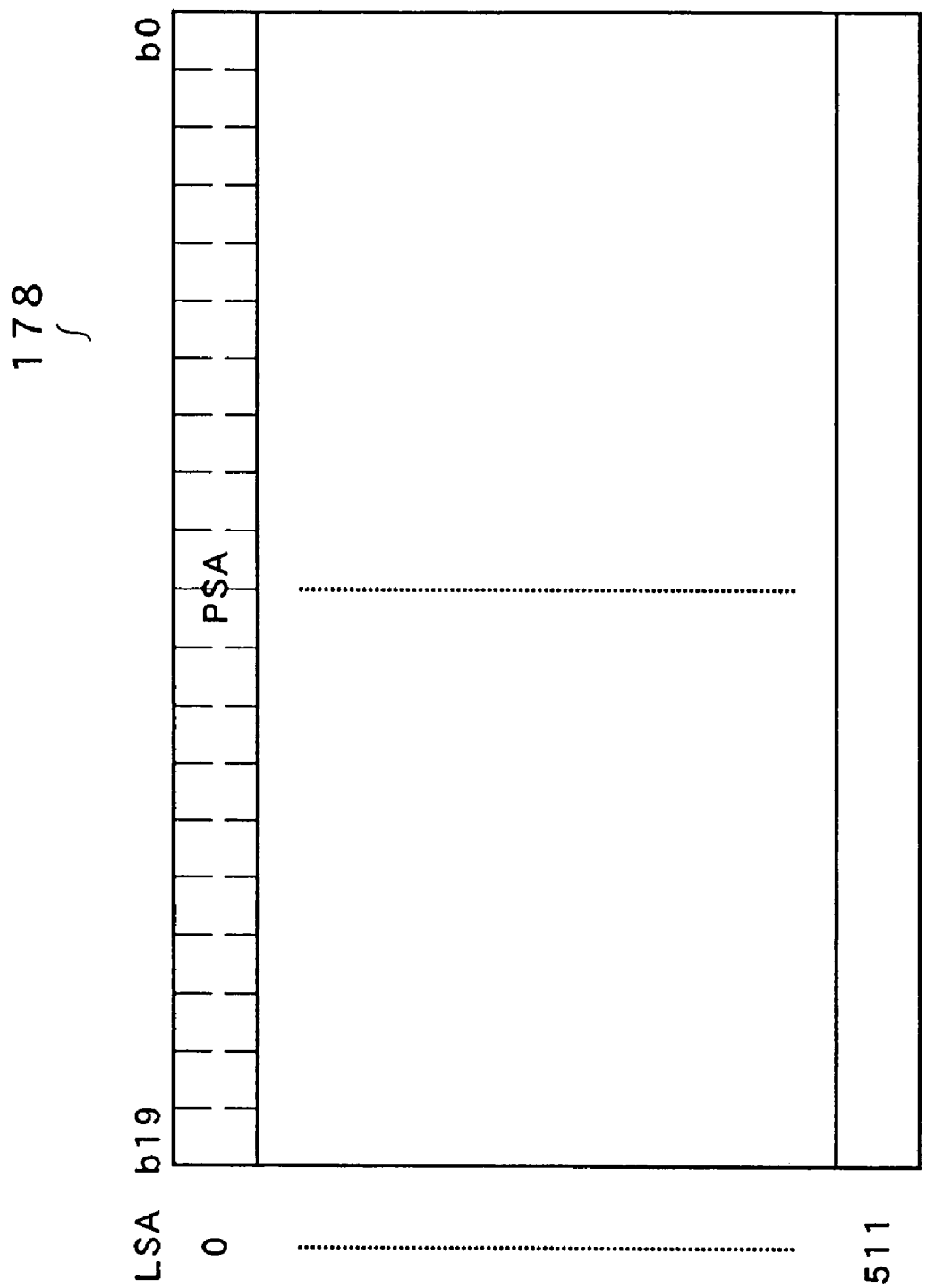
FIG. 22 is a diagram showing an example of an address converting table.

FIG. 22 is a diagram showing the address converting table 178. The address converting table is a logical/physical converting table into which a logical sector address in a logical block into which a directory entry is written and a physical sector address corresponding thereto are written.

Figure 23:
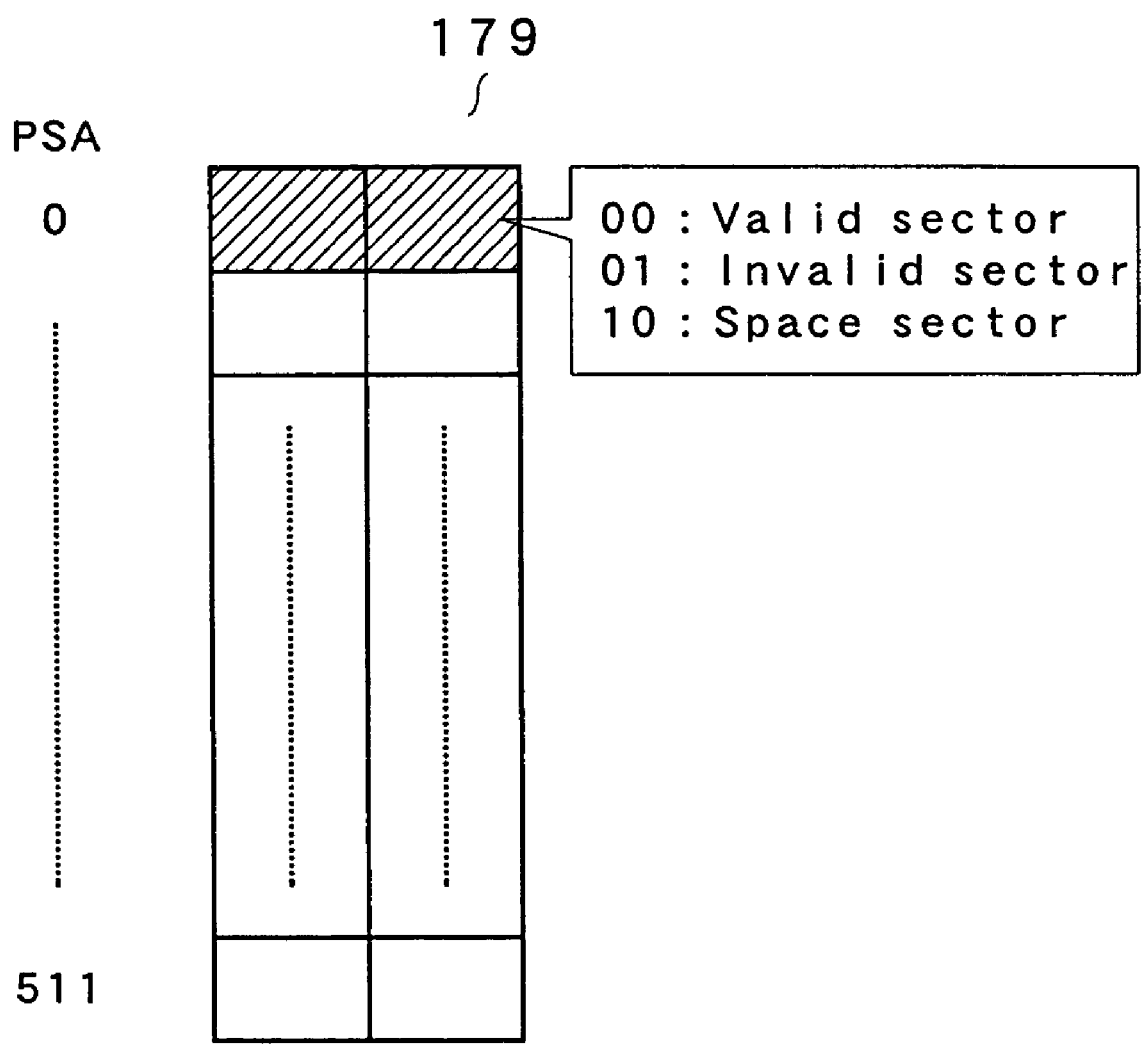
FIG. 23 is an explanatory view showing an example of a physical area managing table.

FIG. 23 is a diagram showing the physical area managing table 179. The physical area managing table 179 is a table showing the status of the sector to sector address PSA of a physical block into which a directory entry is written. Here, the value 00 refers to a valid sector, the value 01 refers to an invalid sector, and the value 10 refers to a space sector.

The operation of the nonvolatile memory system of the third embodiment will be described in that the performance is increased especially by introducing a write to add method. The point of further increasing the performance is to use a method in which copy does not occur for every each update of a directory entry. The write once method disclosed in JP-A 05-27924, that is, a method in which a directory entry is written once into each physical sector having physical blocks in order of occurrence of write instruction, not in logical sector order, is adopted.

The write to add is performed without a copy process until there become no space sectors in a physical block or the number of space sectors becomes not over a predetermined number. When there are no space sectors in a physical block or the number of space sectors becomes not over a predetermined number, another erased physical block is searched. The directory entry is rerecorded or copied in the physical block in logical sector order. As the directory entry has a relatively small size, as 512 bytes, and the physical block size is 128 KB, the write to add up to 512 times can be done to one physical block. In fact, the possibility of occurrence of the copy process is low so that high-speed write can be done.

While writing or rewriting up to 512 file data, a directory entry can be updated at high speed. This is the reason why the write to add method is applied to writing a directory entry. FIG. 24 explains it specifically and is an explanatory view showing how file data and a directory entry are written into a physical block in the nonvolatile memory 171 at writing. FIG. 24 shows the status that a directory entry is written into physical block PBA4 and other directory entries are written to add by the write commands WCMD 2 and WCMD 4. Here, the size of the directory entry is small, as 512 B, and is written to add into the same cluster 23. As compared with FIG. 14, no copy process occurs for every each update of a directory entry. In FIG. 14, the number of write is four and the number of copy is 19, however, in FIG. 24, the number of write is six and the number of copy is four. As the number of copy is absolutely lower, the write performance is found to be higher.

The entire process when applying the write to add method only to a directory entry will be described using FIG. 20. In FIG. 20, the data identifying part 161 identifies file data and a directory entry that the access device 150C transfers in the write process. As the identifying method according to this embodiment, assuming that "file data is written in units of each cluster", the file data or the directory entry can be identified by the difference in the data capacity. Specifically, when a transfer completion command reaches after transferring data of 512 bytes, the data is a directory entry The data may be processed as file data otherwise.

Another identifying method is considered which changes write command kind like the second embodiment. Specifically, a multi-write command is used for file data and a single write command is used for a directory entry. As a further identifying method, a flag may be given to a write command to identify file data or a directory entry by the flag. In either method, a fixed limit is given to the access device 150C and the nonvolatile memory device 140C.

The data identifying part 161 switches the bus switching part 173 and the selector 174 by a control signal when transferred data is identified as file data, and the first control part 115 is connected to the input bus side, so that its output becomes the input of the main memory 171. In this case, the first control part 115 performs the similar write process to that of the conventional nonvolatile memory system. On the other hand, when the data identifying part 161 identifies that the transferred data is a directory entry, the data identifying part 161 switches the input bus toward the bus switching part 173 to the second control part 172 side by a control signal, and in the selector 174, the output of the second control part 172 is the main memory 171. In this case, the second control part 172 performs the write to add process.

The mechanism of the write to add process will be described using FIGS. 25 to 33. FIG. 25 is an explanatory view showing the arrangement of the physical sector addresses PSA when the physical block size of the main memory 171 is 128 KB. In FIG. 25, the PSA expresses the abbreviation of a physical sector address and a number given to the PSA expresses an address value. PSA0, PSA1, . . . , and PSA511 are arranged in page address descending order. A directory entry is written in these arrangement order.

Figure 26:
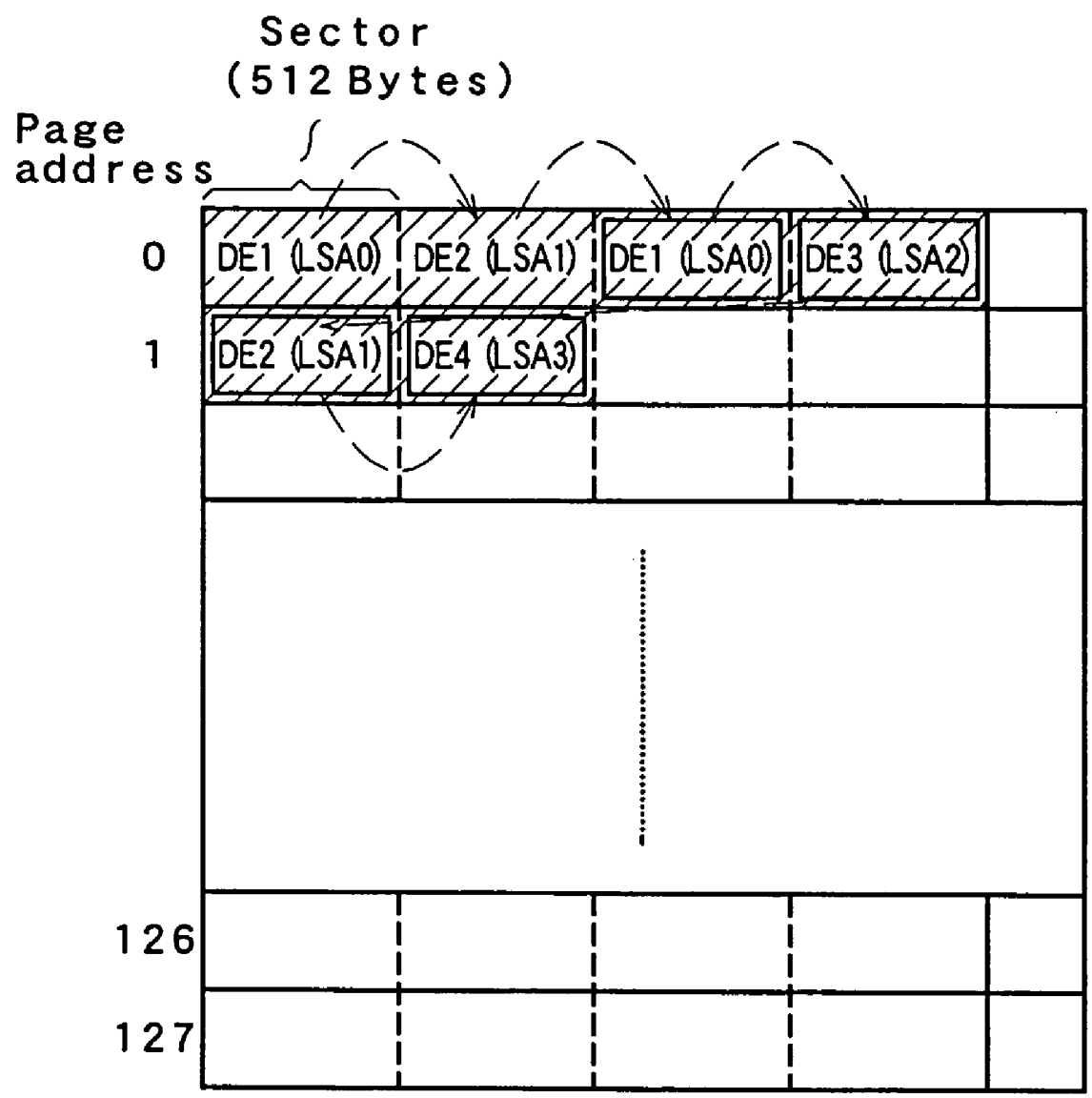
FIG. 26 is a diagram showing the recording status of a physical block for a directory entry.

FIG. 26 is an explanatory view showing a sequence in which directory entries DE1 to DE4 are written into the physical block shown in FIG. 25. In FIG. 26, the hatched sectors refer to sectors in use, and the unhatched sectors refer to space sectors, that is, erased sectors. The sectors enclosed by a double box of the hatched sectors are sectors into which the newest directory entry is recorded and are valid sectors. The sectors enclosed by a single box of the hatched sectors are sectors into which an old directory entry is recorded and are invalid sectors. The directory entry DE1 corresponding to the file 1 is written into PSA0. The numerical subscript of the directory entry DE1 corresponds to a file number, and a number obtained by subtracting 1 from the file number is the numerical subscript of logical sector address LSA0. The file data write order is file 1, file 2, file 1, file 3, file 2, and then file 4. A directory entry corresponding thereto is written to add, as shown in FIG. 26. In FIG. 26, the hatched sectors are sectors in use and the unhatched sectors are space sectors, that is, erased sectors. The sectors enclosed by a double box of the hatched sectors are sectors into which the latest directory entry is recorded and are handled as valid sectors. The sectors enclosed by a single box of the hatched sectors are sectors into which an old directory entry is recorded and are handled as invalid sectors.

FIGS. 27 to 33 show that according to the write order, data is converted to the logical sector address LSA and the physical sector address PSA corresponding thereto and how a status flag of each physical sector address PSA is changed. The left blocks in the drawings show logical blocks allocated to a directory entry on a logical address space seen from the access device 150C. Here, LSA0 to LSA511 are given as relative logical sector addresses. Physical block corresponding to the block on the logical address space are shown on the right side of FIGS. 27 to 33. The physical blocks are physical blocks for writing the directory entry DE and are physical blocks matched by the address converting table 132 of the address managing part 116. Specific sectors in the physical blocks are matched by the address converting table 178 in the address managing part 175 of the second control part 172. FIGS. 27 to 33 show relative sector addresses PSA0 to 511 of the physical blocks.

Figure 27:
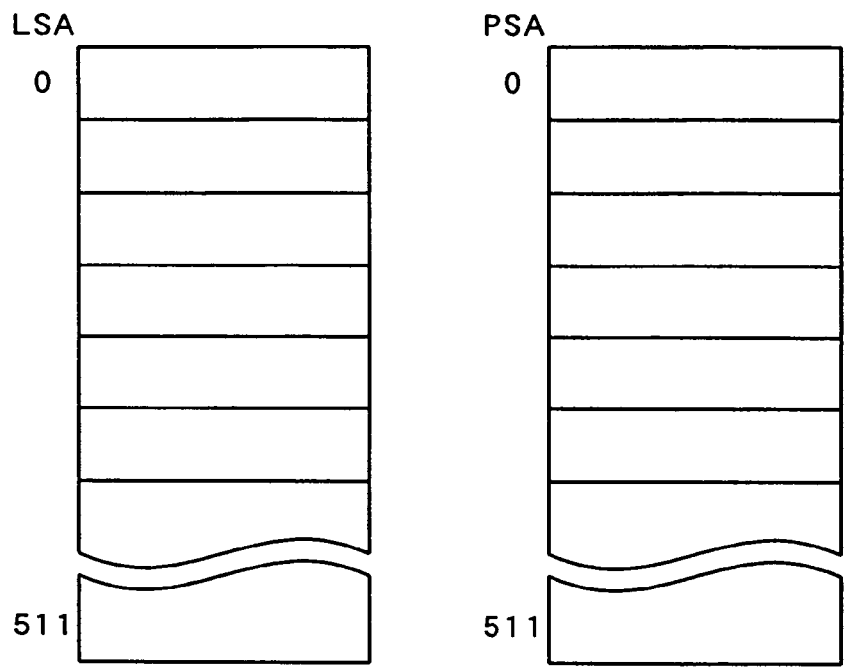
FIG. 27 is an explanatory view showing a logical block for a data entry on a logical address space of this embodiment and a physical block corresponding thereto.
Figure 28:
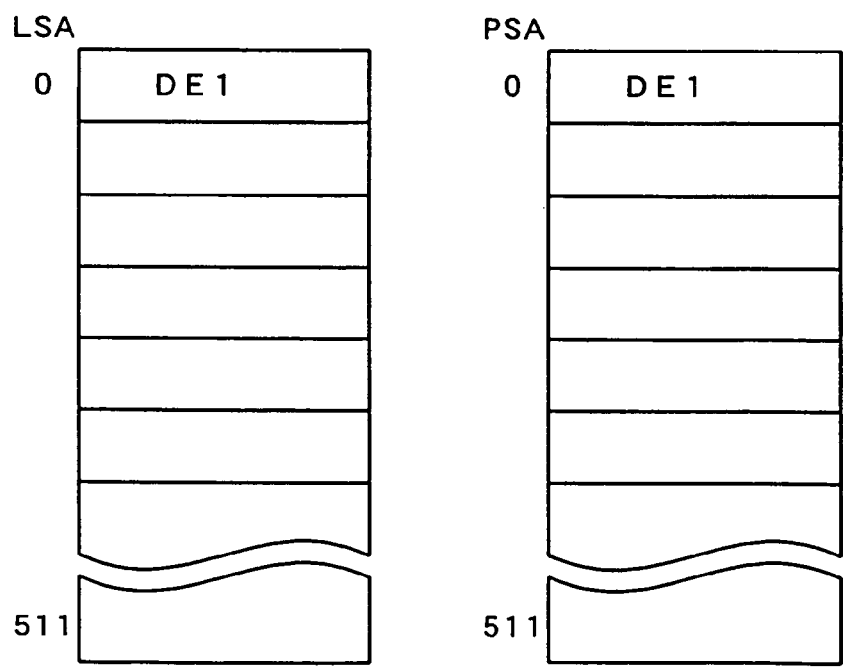
FIG. 28 is an explanatory view showing a logical block for a data entry on a logical address space of this embodiment and a physical block corresponding thereto.

FIG. 27 shows an initial status in which no directory entry is written. As shown in FIG. 28, the directory entry DE1 is written into the logical sector address LSA0 of the block for a data entry on a logical address. Because of the first write on the main memory 171, the directory entry DE1 is written into the physical sector address PSA0. Hereat, the sector status corresponding to the position of the converted PSA0 is changed to the value 00, that is, a valid status, on the physical area managing table 179.

Figure 29:
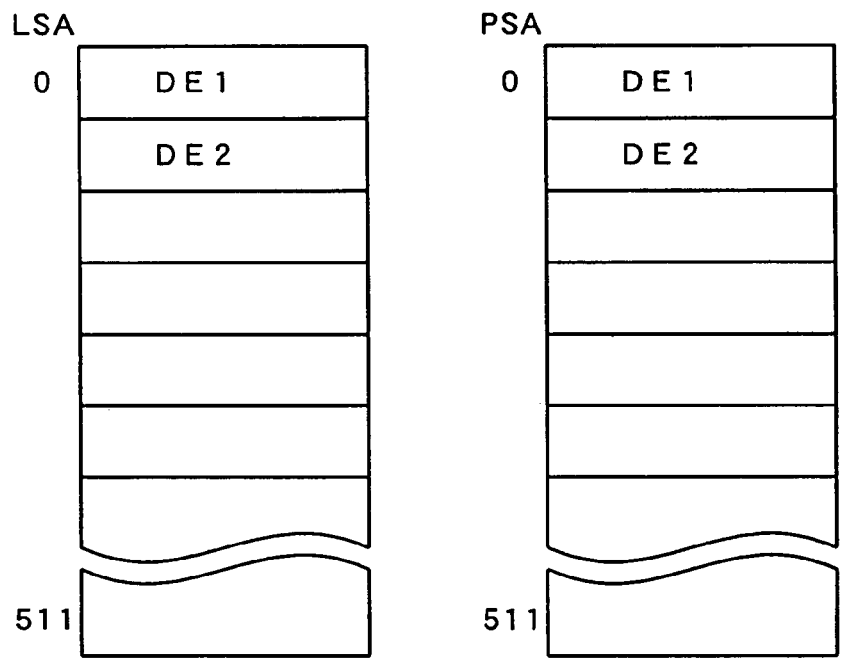
FIG. 29 is an explanatory view showing a logical block for a data entry on a logical address space of this embodiment and a physical block corresponding thereto.

In the same manner, FIG. 29 shows the update status of a logical block and a physical block corresponding thereto when the directory entry DE2 is written into the logical sector address LSA1.

Figure 30:
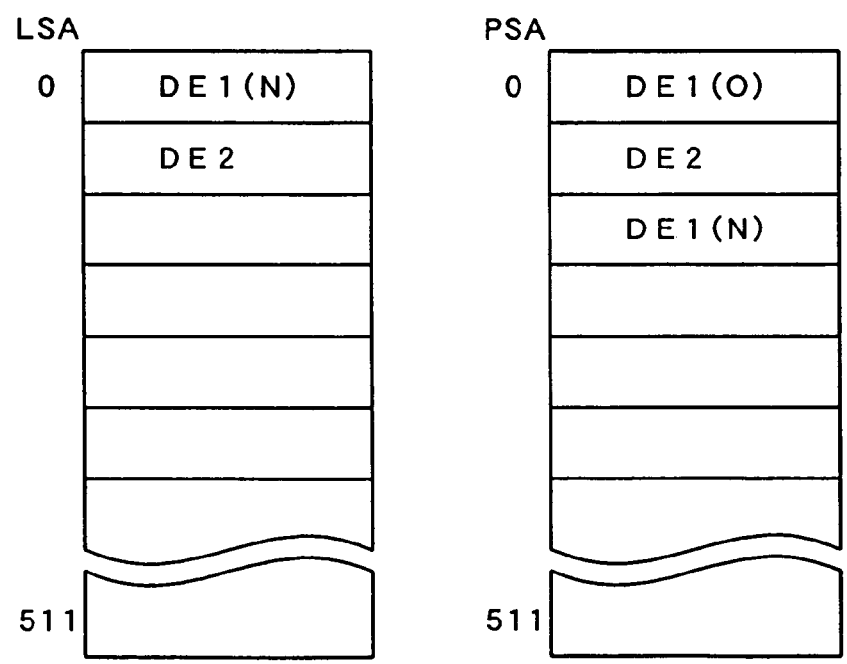
FIG. 30 is an explanatory view showing a logical block for a data entry on a logical address space of this embodiment and a physical block corresponding thereto.

FIG. 30 explains the rewrite process of the directory entry DE1 of the logical sector address LSA0. As the third write, new directory entry DE1 (N) is written into the physical sector address PSA2. That is to say, in the address converting table 178, the physical sector corresponding to the logical sector address LSA0 is the PSA2 and the sector status corresponding to the position of the PSA2 is changed to a valid status on the physical area managing table 179. Furthermore, as original directory entry DE1 (0) already recorded into the position of the PSA0 is unnecessary, the sector status corresponding to the position of the PSA0 is changed to the value 01, that is, an invalid status, on the physical area managing table 179.

Figure 31:
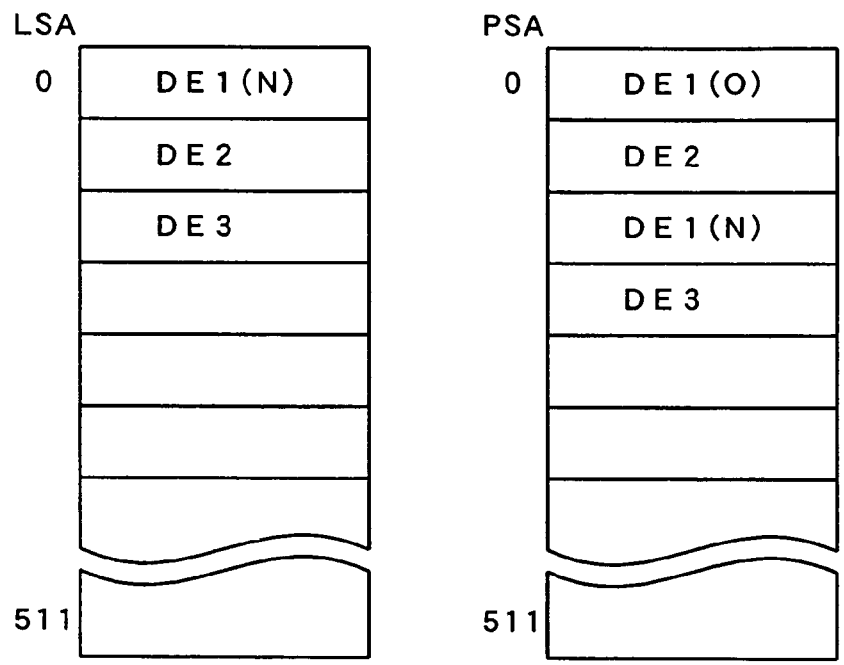
FIG. 31 is an explanatory view showing a logical block for a data entry on a logical address space of this embodiment and a physical block corresponding thereto.
Figure 32:
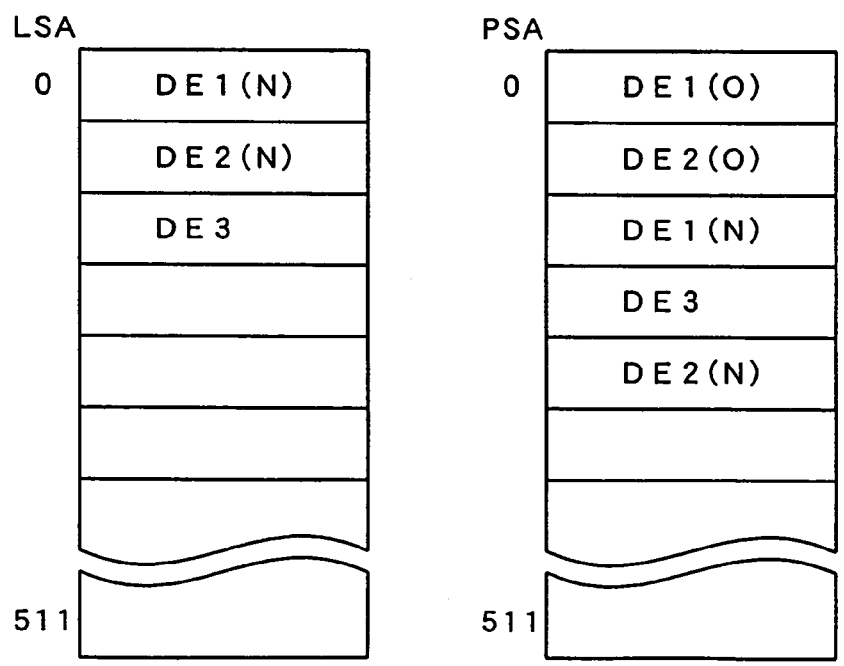
FIG. 32 is an explanatory view showing a logical block for a data entry on a logical address space of this embodiment and a physical block corresponding thereto.

In the similar manner, in FIGS. 31 to 33, rewrite is performed in a logical sector address, and the directory entry is updated in the block for a directory entry of a logical address space corresponding to this rewriting and updating. The physical block for a directory entry is written to add corresponding thereto. According to this, the address converting table and the sector status are changed.

Figure 34:
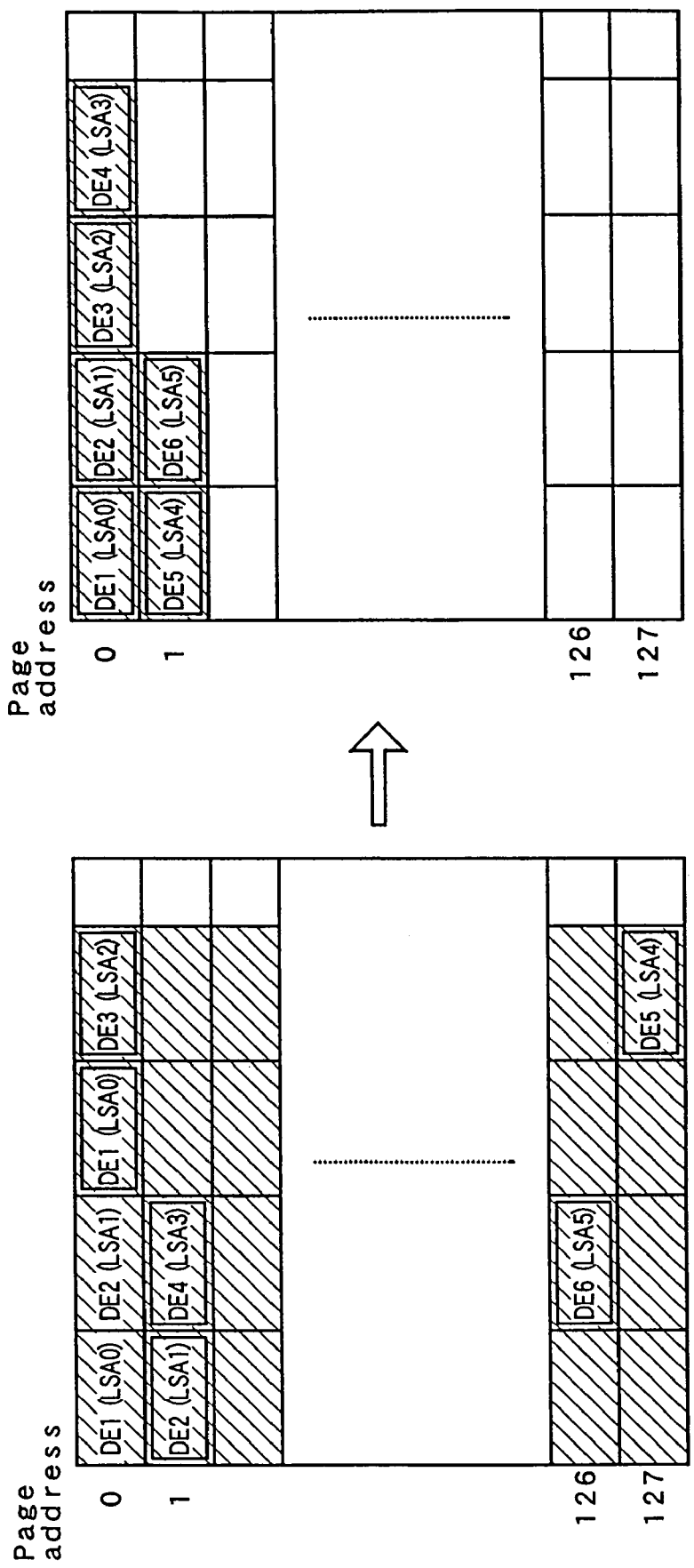
FIG. 34 is an explanatory view showing a rearrangement process of a logic and physical block according to this embodiment.

As described above, according to a series of write and rewrite processes, the directory entry of the physical sector to the logical sector address is updated. Finally, as shown in the left side of FIG. 34, all physical sector addresses of a physical block into which a directory entry is written are filled up. In that case, the second control part 172 searches a new erased physical block. As shown in the right side of FIG. 34, each directory entry is rearranged in a new physical block in logical sector address LSA order. Only the valid directory entry is copied and the unnecessary old physical block is erased. When directory entries of a predetermined number of sectors are written into the old physical block, rearrangement and erase processes may be performed. In the above write to add method, the second control part 172 manages the address and writes it into the main memory 171. The physical area managing table 133, however, includes information which physical block is in use or is erased, the information needs to be shared between the first control part 115 and the second control part 172. They transmit and receive information via the bus.

Figure 35:
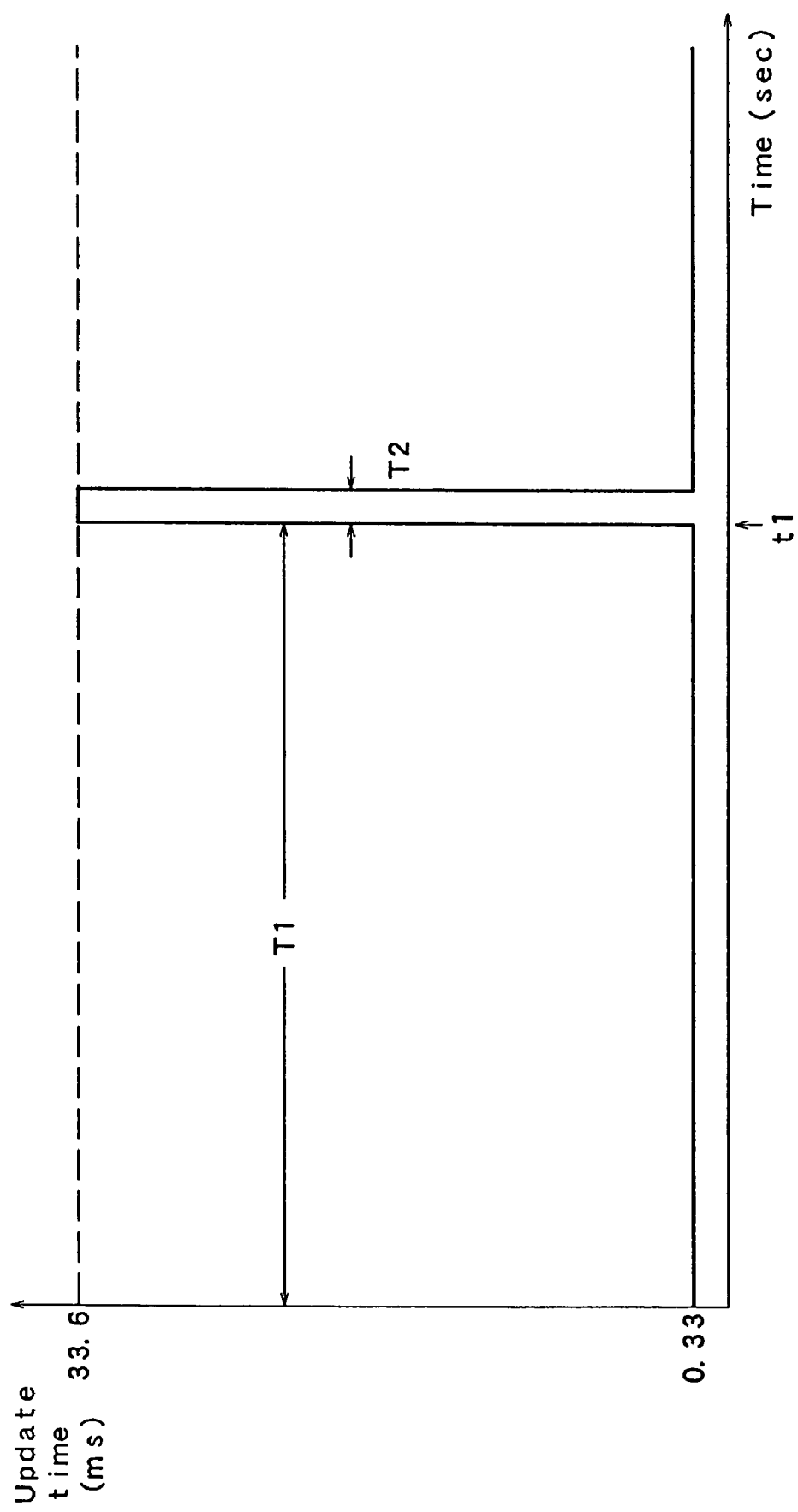
FIG. 35 is a diagram showing the change of directory entry update time.

By applying the write to add method to the directory entry, the directory entry update time is as shown in FIG. 35. The data transfer speed to the main memory 171 is 50 ns per byte, the program busy time of the main memory 171 is 300 µs, the read busy time of the main memory 171 is 25 µs, and the program and read access unit of the main memory 171 is one page (2 KB).

In a period in which there is a space sector in a physical block into which a directory entry is recorded, (50 ns×512 bytes)+(300 µs×one page)=approx. 0.33 ms Thus, the update time is approx. 0.33 ms.

On the other hand, in a period in which rearrangement and erase occur, (50 ns×128 k bytes)+(300 µs×64 pages)+(50 ns×128 k bytes)+(25 µs×64 pages)+2 ms=approx. 33.6 ms Thus, the update time is approx. 33.6 ms.

As described above, directory entry size is much smaller than physical block size. In fact, as the frequency in which rearrangement and erase occur is low, a directory entry may be updated at about 0.33 ms on average. A buffer capable of absorbing the process time of 33.6 ms at low frequency is provided, which is not a problem for the system transfer rate. With 2 MBps×33.6 ms=about 70 KB, the size of the buffer may have an area for 70 KB, for example, the area may be secured in the RAM 113.

As described above, when the access device 150C writes file data into the nonvolatile memory device 140C, the file system control part 155C writes file data and a directory entry corresponding thereto into different allocation units, that is, different physical blocks. Therefore, the file data can be easily written continuously and the number of file copy can be decreased at updating a directory entry. The directory entry update speed can be increased, since the data identifying part 161 identifies whether data written is file data or a directory entry, when writing a directory entry, the second control part 172 performs the write to add into a physical block of the main memory 171.

In this case, the write speed can be increased, and the directory entry update speed can be increased.

The nonvolatile memory system according to the present invention enables high-speed write in the nonvolatile memory device using a nonvolatile memory in which physical block size is larger than cluster size. It is useful for various electronic devices using a nonvolatile memory device such as a semiconductor memory card, e.g., a still image read/write device and a moving image read/write device, or a cellular phone.

What is claimed is:

1. A nonvolatile memory system which comprises an access device and a nonvolatile memory device and writes file data and file data management information of the file data into the nonvolatile memory device,
   the nonvolatile memory device including:
   a nonvolatile main memory containing,
   a data area which stores the file data and the file data management information, the data area being managed by an allocation unit having continuous clusters as a managing unit of the file data, the allocation unit and the cluster being indicated by a logical address, and being managed by a physical block indicated by a physical address,
   the allocation unit being equal to or larger than the physical block and the physical block being equal to or larger than the cluster, and
   a management information area which stores information of the file data and the file data management information; and
   a memory controller containing an address managing portion which decides physical addresses of the data area in the main memory for storing the file data and the file data management information based on logical addresses of the file data and the file data management information given from the access device, and
   a main memory access portion which writes the file data and the file data management information into different allocation units of the data area in the main memory according to the physical addresses decided by the address managing portion, and the access device including a file system control portion which controls the logical addresses of the file data and the file data management information in order to store the file data and the file data management information in different allocation units of the data area and giving the file data, the file data management information and the logical addresses to the nonvolatile memory device.

2. The nonvolatile memory system according to claim 1, wherein the access device writes a plurality of the file data management information into a specific allocation unit.

3. The nonvolatile memory system according to claim 1, wherein the main memory is a nonvolatile memory enabling write to add data into an area of each physical block, and
   the memory controller comprises:
   a second address managing portion which converts a logical sector address in the allocation unit to a physical sector address; and
   a second main memory access portion which accesses a physical block according to the sector address indicated by the second address managing portion when writing the file management information.

4. The nonvolatile memory system according to claim 1, wherein the access device has at least two kinds of write commands in order to identify the file data and the file data management information.

5. The nonvolatile memory system according to claim 1, wherein a write command has an argument and the argument is changed in order to identify the file data and the file data management information.

6. The nonvolatile memory system according to claim 1, wherein the memory controller notifies a memory capacity of the main memory to the access device, and
   the access device decides a size of the allocation unit based on the memory capacity notified by the memory controller.

7. The nonvolatile memory system according to claim 1, wherein the memory controller notifies a physical block size of the main memory to the access device, and
   the access device decides a size of the allocation unit based on the physical block size notified by the memory controller.

8. The nonvolatile memory system according to claim 1, wherein the access device selectively uses only allocation units in which a fixed space area exists.

9. The nonvolatile memory system according to claim 1, wherein the nonvolatile memory device further includes a nonvolatile auxiliary memory which has an assured rewrite number larger than that of the main memory and enables overwrite, and
   the memory controller writes the file data management information into the auxiliary memory.

10. The nonvolatile memory system according to claim 9, wherein the auxiliary memory is a nonvolatile memory having a write speed higher than that of the main memory.

11. The nonvolatile memory system according to claim 9, wherein the auxiliary memory is a nonvolatile RAM.

12. The nonvolatile memory system according to claim 11, wherein the auxiliary memory is any one of a ferroelectric memory (FeRAM), a magnetic recording type random access memory (MRAM), an Ovonic unified memory (OUM), and a resistance RAM (PRAM)

13. A nonvolatile memory device comprising:
    a nonvolatile main memory including,
    a data area which stores file data and file data management information of the file data, the data area being managed by an allocation unit having continuous clusters as a managing unit of the file data, the allocation unit and the cluster being indicated by a logical address and being managed by a physical block indicated by a physical address, and the allocation unit being equal to or larger than the physical block and the physical block being equal to or larger than the cluster, and
    a management information area which stores information of the file data and the file data management information;
    a memory controller including
    an address managing portion which decides physical addresses of the data area in the main memory for storing the file data and the file data management information based on logical addresses of the file data and the file data management information given from the access device,
    a main memory access portion which writes the file data and the file data management information into different allocation units of the data area in the main memory according to the physical addresses decided by the address managing portion.

14. The nonvolatile memory device according to claim 13, wherein the main memory is a nonvolatile memory enabling write to add data into different area of each physical block, and
the memory controller comprises:
a second address managing portion which converts a logical sector address in the allocation unit to a physical sector address; and
a second main memory access portion which accesses a physical block of the main memory according to the physical sector address indicated by the second address managing portion when writing the file data management information.

15. The nonvolatile memory device according to claim 13, wherein the memory controller notifies a memory capacity of the main memory to the access device.

16. The nonvolatile memory device according to claim 13, wherein the memory controller notifies a physical block size of the main memory to the access device.

17. The nonvolatile memory device according to claim 13, further comprising: a nonvolatile auxiliary memory which has an assured rewrite number larger than that of the main memory and enables overwrite,
wherein the memory controller writes the file data management information into the auxiliary memory.

18. The nonvolatile memory device according to claim 17, wherein the auxiliary memory is a nonvolatile memory having a write speed higher than that of the main memory.

19. The nonvolatile memory device according to claim 17, wherein the auxiliary memory is a nonvolatile RAM.

20. The nonvolatile memory device according to claim 19, wherein the auxiliary memory is any one of a ferroelectric memory (FeRAM), a magnetic recording type random access memory (MRAM), an Ovonic unified memory (OUM), and a resistance RAM (PRAM)

21. A memory controller which write file data and file data management information of the file data into a nonvolatile main memory including a data area which stores the file data and the file data management information, the data area being managed by an allocation unit having continuous clusters as a managing unit of the file data, the allocation unit and the cluster being indicated by a logical address and being managed by a physical block indicated by a physical address, and the allocation unit being equal to or larger than the physical block and the physical block being equal to or larger than the cluster, and a management information area which stores information of the file data and the file data management information, comprising:
an address managing portion which decides physical addresses of the data area in the nonvolatile memory for storing the file data and the file data management information based on logical addresses of the file data and the file data management information given from an access device; and
a main memory access portion which writes the file data and the file data management information into different allocation units of the data area in the nonvolatile memory according to the physical addresses decided by the address managing portion.

22. The memory controller according to claim 21, wherein the main memory is a nonvolatile memory enabling write to add data into a different area of each physical block, and
the memory controller comprises:
a second address managing portion which converts a logical sector address in the allocation unit to a physical sector address; and
a second main memory access portion which accesses a physical block according to the sector address indicated by the second address managing portion when writing the file data management information.

23. The memory controller according to claim 21, wherein the memory controller notifies a memory capacity of the main memory to the access device.

24. The memory controller according to claim 21, wherein the memory controller notifies a physical block size of the main memory to the access device.

25. The memory controller according to claim 21, further comprising: a nonvolatile auxiliary memory which has an assured rewrite number larger than that of the main memory and enables overwrite,
wherein the memory controller writes the file data management information into the auxiliary memory.

26. The memory controller according to claim 25, wherein the auxiliary memory is a nonvolatile memory having a write speed higher than that of the main memory.

27. The memory controller according to claim 25, wherein the auxiliary memory is a nonvolatile RAM.

28. The memory controller according to claim 27, wherein the auxiliary memory is any one of a ferroelectric memory (FeRAM), a magnetic recording type random access memory (MRAM), an Ovonic unified memory (OUM), and a resistance RAM (PRAM).

29. A method for controlling a nonvolatile memory device including a nonvolatile main memory and a memory controller,
the main memory containing:
a data area which stores file data and file data management information of the file data, the data area being managed by an allocation unit having continuous clusters as a managing unit of the file data, the allocation unit and the cluster being indicated by a logical address and being managed by a physical block indicated by a physical address, and the allocation unit being equal to or larger than the physical block and the physical block being equal to or larger than the cluster; and
a management information area which stores information of the file data and the file data management information, and
the memory controller containing an address managing portion and a main memory access portion,
the method comprising:
deciding physical addresses of the data area in the main memory for storing the file data and the file data management information based on logical addresses of the file data and the file data management information given from an access device by the address managing portion; and
writing the file data and the file data management information into different allocation units of the data area in the main memory according to the decided physical addresses decided by the main memory access portion.

30. The method for controlling a nonvolatile memory device according to claim 29, wherein the main memory is a nonvolatile memory enabling write to add data into an area of each physical block,
a logical sector address in the allocation unit is converted to a physical sector address by a second address managing portion of the memory controller, and a physical block of the main memory is accessed according to the physical sector address indicated by the second address managing portion when writing the file data management information.

31. The method for controlling a nonvolatile memory device according to claim 29, wherein the access device has at least two kinds of write commands in order to identify the file data and the file data management information.

32. The method for controlling a nonvolatile memory device according to claim 29, wherein the access device changes an argument of a write command when identifying and writing the file data and the file data management information into the main memory.

33. The method for controlling a nonvolatile memory device according to claim 29, wherein the access device decides a size of the allocation unit based on a memory capacity of the main memory notified by the memory controller.

34. The method for controlling a nonvolatile memory device according to claim 29, wherein the access device decides a size of the allocation unit based on a physical block size of the main memory notified by the memory controller.

35. The method for controlling a nonvolatile memory device according to claim 29, wherein the access device selectively uses only the allocation unit in which a fixed space area exists.

36. The method for controlling a nonvolatile memory device according to claim 29, wherein the nonvolatile memory device further includes a nonvolatile auxiliary memory which has the assured rewrite number larger than that of the main memory and enables overwrite, and the memory controller writes the file data management information into the auxiliary memory.

37. An access device which writes file data and file data management information of the file data into a nonvolatile memory device, the nonvolatile memory device including:

a data area which stores the file data and the file data management information, the data area being managed by an allocation unit having continuous clusters as a managing unit of the file data, the allocation unit and the cluster being indicated by a logical address and being managed by a physical block indicated by a physical address, and the allocation unit being equal to or larger than the physical block and the physical block being equal to or larger than the cluster; and a management information area which stores information of the file data and the file data management information, the access device comprising a file system control portion which controls logical addresses of the file data and the file data management information in order to store the file data and the file data management information in different allocation units of the data area, and writing the file data and the file data management information based on their logical addresses into the different allocation units of the data area in the nonvolatile memory device.

38. The access device according to claim 37, wherein the access device writes a plurality of the file data management information into a specific allocation unit.

39. The access device according to claim 37, wherein the access device has at least two kinds of write commands in order to identify the file data and the file data management information.

40. The access device according to claim 37, wherein a write command has an argument and the argument is changed in order to identify the file data and the file data management information.

41. The access device according to claim 37, wherein a size of the allocation unit is decided based on a memory capacity notified from the nonvolatile memory device.

42. The access device according to claim 37, wherein a size of the allocation unit is decided based on a physical block size notified from the nonvolatile memory device.

43. The access device according to claim 37, wherein only allocation units in which a fixed space area exists is selectively used.

* * * * *